(12) United States Patent
Jannard et al.

(10) Patent No.: US 8,773,766 B2
(45) Date of Patent: Jul. 8, 2014

(54) LIQUID OPTICS WITH FOLDS LENS AND IMAGING APPARATUS

(75) Inventors: James H. Jannard, Las Vegas, NV (US); Iain A. Neil, Massagno (CH)

(73) Assignee: Blackeye Optics, LLC, Eastsound, WA (US)

( * ) Notice: Subject to any disclaimer, the term of this patent is extended or adjusted under 35 U.S.C. 154(b) by 0 days.

(21) Appl. No.: 12/327,651

(22) Filed: Dec. 3, 2008

(65) Prior Publication Data

US 2009/0141365 A1    Jun. 4, 2009

Related U.S. Application Data

(60) Provisional application No. 60/992,244, filed on Dec. 4, 2007.

(51) Int. Cl.
| | | |
|---|---|---|
| *G02B 15/16* | (2006.01) | |
| *G02B 3/14* | (2006.01) | |
| *G02B 15/173* | (2006.01) | |

(52) U.S. Cl.
CPC .............. *G02B 15/16* (2013.01); *G02B 15/173* (2013.01); *G02B 3/14* (2013.01)
USPC ............................. 359/689; 359/666; 359/678

(58) Field of Classification Search
CPC ......... G02B 15/16; G02B 15/173; G02B 3/14
USPC ................. 359/665–666, 683–690, 676, 678; 396/72–88; 348/240.99–240.3
See application file for complete search history.

(56) References Cited

U.S. PATENT DOCUMENTS

| | | | |
|---|---|---|---|
| 3,161,718 A | | 12/1964 | De Luca et al. |
| 3,366,437 A | * | 1/1968 | Hisao Moriyama et al. . 359/683 |
| 4,407,567 A | | 10/1983 | Michelet et al. |
| 4,784,479 A | | 11/1988 | Ikemori |
| 4,871,240 A | * | 10/1989 | Suda .............................. 359/666 |
| 5,315,435 A | | 5/1994 | Horiuchi |
| 6,166,864 A | * | 12/2000 | Horiuchi ....................... 359/687 |
| 6,369,954 B1 | | 4/2002 | Berge et al. |
| 6,449,081 B1 | | 9/2002 | Onuki et al. |
| 6,459,535 B1 | | 10/2002 | Goto |

(Continued)

FOREIGN PATENT DOCUMENTS

| | | |
|---|---|---|
| CN | 1705901 A | 12/2005 |
| CN | 101208627 A | 6/2008 |

(Continued)

OTHER PUBLICATIONS

Partial International Search Report of PCT Application No. PCT/US2008/084233, date of mailing Apr. 14, 2009—7 pages.

(Continued)

*Primary Examiner* — Zachary Wilkes
(74) *Attorney, Agent, or Firm* — Knobbe, Martens, Olson & Bear LLP

(57) ABSTRACT

A high performance zoom lens system suitable for use with a camera is disclosed. The zoom lens systems employs redirection of the radiation axis, liquid optics and a movable lens group to provide optical performance over the zoom focal length range at focus distances from close to infinity. The system also provides compensation for undesirable thermally induced effects by adjustments of the zoom group and the variably shaped optical surface in the liquid lens cell.

22 Claims, 16 Drawing Sheets

(56) References Cited

U.S. PATENT DOCUMENTS

| | | | |
|---|---|---|---|
| 6,538,823 B2 | 3/2003 | Kroupenkine et al. | |
| 6,674,473 B1* | 1/2004 | Takada | 359/689 |
| 6,702,483 B2 | 3/2004 | Tsuboi et al. | |
| 6,781,622 B1 | 8/2004 | Sato et al. | |
| 6,906,867 B2* | 6/2005 | Nagata | 359/676 |
| 6,924,944 B2 | 8/2005 | Sekiyama | |
| 6,934,090 B2 | 8/2005 | Nagaoka et al. | |
| 6,936,809 B2 | 8/2005 | Viinikanoja | |
| 6,950,245 B2 | 9/2005 | Nishioka et al. | |
| 6,952,313 B2 | 10/2005 | Schrader | |
| 6,965,480 B2 | 11/2005 | Kroupenkine | |
| 6,987,529 B1 | 1/2006 | Ito | |
| 6,992,700 B1 | 1/2006 | Sato et al. | |
| 7,006,299 B2 | 2/2006 | Kroupenkine | |
| 7,126,903 B2 | 10/2006 | Feenstra et al. | |
| 7,142,368 B2 | 11/2006 | Kim et al. | |
| 7,218,429 B2 | 5/2007 | Batchko | |
| 7,224,534 B2 | 5/2007 | Ootsuka | |
| 7,227,682 B2 | 6/2007 | Caldwell et al. | |
| 7,230,771 B2 | 6/2007 | Kuiper et al. | |
| 7,253,966 B2 | 8/2007 | Saori | |
| 7,265,911 B2 | 9/2007 | Goosey et al. | |
| 7,317,580 B2 | 1/2008 | Kogo et al. | |
| 7,382,545 B2 | 6/2008 | Jung et al. | |
| 7,408,717 B2 | 8/2008 | Renders et al. | |
| 7,413,306 B2 | 8/2008 | Campbell | |
| 7,466,493 B2 | 12/2008 | Kim et al. | |
| 7,855,838 B2* | 12/2010 | Jannard et al. | 359/665 |
| 8,027,096 B2 | 9/2011 | Feng et al. | |
| 8,154,805 B2 | 4/2012 | Jannard et al. | |
| 8,169,709 B2 | 5/2012 | Jannard et al. | |
| 8,638,496 B2 | 1/2014 | Jannard et al. | |
| 2002/0176148 A1 | 11/2002 | Onuki et al. | |
| 2005/0113912 A1 | 5/2005 | Feenstra et al. | |
| 2005/0200973 A1 | 9/2005 | Kogo et al. | |
| 2005/0225877 A1 | 10/2005 | Tang | |
| 2006/0028734 A1 | 2/2006 | Kuiper et al. | |
| 2006/0045504 A1 | 3/2006 | Zarnowski et al. | |
| 2006/0047039 A1 | 3/2006 | Kato et al. | |
| 2006/0067663 A1* | 3/2006 | Kita | 396/72 |
| 2006/0106426 A1 | 5/2006 | Campbell | |
| 2006/0126190 A1 | 6/2006 | Berge et al. | |
| 2006/0227415 A1* | 10/2006 | Caldwell et al. | 359/432 |
| 2006/0256429 A1 | 11/2006 | Obrebski et al. | |
| 2007/0041101 A1 | 2/2007 | Goosey et al. | |
| 2007/0153399 A1 | 7/2007 | Hendriks et al. | |
| 2007/0247727 A1 | 10/2007 | Kim | |
| 2007/0263293 A1 | 11/2007 | Batchko et al. | |
| 2009/0091844 A1 | 4/2009 | Jannard | |
| 2009/0141352 A1 | 6/2009 | Jannard | |
| 2009/0141365 A1 | 6/2009 | Jannard et al. | |
| 2009/0185281 A1 | 7/2009 | Hendriks | |
| 2010/0259817 A1 | 10/2010 | Jannard et al. | |
| 2010/0259833 A1 | 10/2010 | Jannard | |
| 2011/0058258 A1 | 3/2011 | Wang et al. | |
| 2011/0085244 A1 | 4/2011 | Jannard | |
| 2011/0211262 A1 | 9/2011 | Craen et al. | |
| 2012/0281295 A1 | 11/2012 | Jannard et al. | |

FOREIGN PATENT DOCUMENTS

| | | |
|---|---|---|
| CN | 101821658 A | 9/2010 |
| CN | 102388325 A | 3/2012 |
| CN | 102388332 A | 3/2012 |
| CN | ZL 200880110582.1 | 10/2013 |
| EP | 2 071 367 A1 | 6/2009 |
| IN | 81/7/CHENP/2011 A | 3/2013 |
| JP | 59-116712 | 7/1984 |
| JP | 60-254014 | 12/1985 |
| JP | 63-208817 | 8/1988 |
| JP | 01-129221 | 5/1989 |
| JP | 6-160779 | 6/1994 |
| JP | 09-138345 | 5/1997 |
| JP | 2001-249261 | 9/2001 |
| JP | 2003-057410 A | 2/2003 |
| JP | 2004-312239 | 11/2004 |
| JP | 2004-333640 | 11/2004 |
| JP | 2004-356175 | 12/2004 |
| JP | 2006-064947 | 3/2006 |
| JP | 2007-094170 | 4/2007 |
| JP | 2007-121821 | 5/2007 |
| JP | 2008-170874 | 7/2008 |
| KR | 10-2005-0059291 A | 6/2005 |
| KR | 10-2005-0033308 A | 12/2005 |
| TW | 2004-20910 | 10/2004 |
| TW | 200632364 A | 9/2006 |
| TW | 200730911 A | 8/2007 |
| WO | 2004/038480 A1 | 5/2004 |
| WO | WO 2004/038480 | 5/2004 |
| WO | WO 2004/083899 | 9/2004 |
| WO | WO 2005/069042 | 7/2005 |
| WO | WO 2006/103290 A1 | 10/2006 |
| WO | WO 2006/110283 | 10/2006 |
| WO | WO 2008/010124 A1 | 1/2008 |
| WO | WO 2009/048725 A1 | 4/2009 |
| WO | WO 2009/073387 A1 | 6/2009 |
| WO | WO 2009/073388 A2 | 6/2009 |
| WO | WO 2010/117628 A2 | 10/2010 |
| WO | WO 2010/117731 A2 | 10/2010 |

OTHER PUBLICATIONS

Lyon, "Varioptic to Enforce Liquid Lens Patent Rights", Varioptic Newsletter—Mar. 2004, Mar. 17, 2004.

Opto & Laser Europe, "Liquid lenses eye commercial breakthrough", http://optics.org/articles/ole/8/11/2/1, Nov. 2003.

"Liquid Lenses for Camera Phones", Roland Piquepaille's Technology Trends, http://www.primidi.com/2004/12/02.html, Dec. 2, 2004.

Neil, Iain A., "Compound zoom lenses", Panavision International, L.P., 2005.

"Optical solution", The Economist Newspaper and The Economist Group, http://www.economist.com/PrinterFriendly.cfm?story id=9571244, Jul. 31, 2007.

"Liquid Lens Mass Production", Consumer Electronics Industry, Aug. 30, 2006.

Zubgy, Leonard, "Liquid Lenses, Small variable-focus fluid lens elements", Dec. 8, 2006.

International Search Report of PCT Application No. PCT/US2008/077086, date of mailing Feb. 2, 2009—7 pages.

Written Opinion of PCT Application No. PCT/US2008/077086, date of mailing Feb. 2, 2009—7 pages.

International Search Report of corresponding PCT Application No. PCT/US2008/084232, date of mailing Feb. 23, 2009—7 pages.

Written Opinion of corresponding PCT Application No. PCT/US2008/084232, date of mailing Feb. 23, 2009—6 pages.

"Liquid zoom lenses to be available in camera phones before the end of 2005", Cameras and Imaging, http://www.gizmag.com/go/3922/, Apr. 9, 2005—2 pages.

International Search Report of PCT Application No. PCT/US2008/084233, date of mailing Jul. 3, 2009—10 pages.

Written Opinion of PCT Application No. PCT/US2008/084233, date of mailing Jul. 3, 2009—9 pages.

Notice of Allowance issued on Aug. 11, 2010 in related U.S. Appl. No. 12/246,224, filed Oct. 6, 2008, in 9 pages.

Office Action issued on Dec. 30, 2010 in related U.S. Appl. No. 12/246,224, filed Oct. 6, 2008, in 13 pages.

International Search Report and Written opinion mailed on Feb. 2, 2009, in related International Application No. PCT/US2008/077086, in 14 pages.

Applicant Summary of Interview with Examiner in U.S. Appl. No. 12/327,666, dated Sep. 27, 2010.

Examiner Interview Summary in U.S. Appl. No. 12/327,666, dated Aug. 27, 2010.

International Preliminary Report on Patentability and Written Opinion in PCT/US2008/084233, (International Publication No. WO 2009/073388 A2), dated Jun. 17, 2010.

Office Action in U.S. Appl. No. 12/327,651, dated Mar. 23, 2011.

Response and Amendment in U.S. Appl. No. 12/246,224, dated Apr. 30, 2010.

(56) References Cited

OTHER PUBLICATIONS

Restrictions Requirement in U.S. Appl. No. 12/753,536, dated Feb. 2, 2011.
Exam Report in Australian Application No. 2008311114 dated Jan. 31, 2013.
Examiner Interview Summary in U.S. Appl. No. 12/327,666, dated Jan. 25, 2012.
Examiner Interview Summary in U.S. Appl. No. 12/327,666, dated Jun. 20, 2012.
Notice of Allowance in U.S. Appl. No. 12/753,536, dated Dec. 6, 2011.
Office Action in U.S. Appl. No. 12/327,666, dated Feb. 16, 2012.
Office Action in Chinese Application No. 200880111594.6 mailed Aug. 27, 2012.
Office Action in Chinese Application No. 200880118070 dated Jan. 18, 2012.
Office Action in European Application No. 08837977.1 dated Sep. 5, 2012.
Office Action in Japanese Application No. 2010-528925 mailed Feb. 19, 2013.
Office Action in U.S. Appl. No. 12/327,666, dated Jan. 16, 2013.
Office Action in U.S. Appl. No. 12/753,639 mailed on Dec. 20, 2012.
Second Office Action in Chinese Application No. 200880118070.X dated Jan. 10, 2013.
Supplementary European Search Report in European Application No. 10762108.8 mailed Aug. 17, 2012.
Supplementary European Search Report in European Application No. 10762153.4 mailed Aug. 17, 2012.
International Preliminary Report and Written Opinion on Patentability in PCT Application No. PCT/US2008/084232, dated Jun. 17, 2010.
International Preliminary Report on Patentability and Written Opinion in PCT/US2008/084233, dated Jun. 17, 2010.
International Preliminary Report on Patentability and Written Opinion of PCT Application No. PCT/US2008/077086, date of mailing Apr. 22, 2010—8 pages.
International Preliminary Report on Patentability in Application No. PCT/US2010/028421 mailed Oct. 20, 2011.
International Preliminary Report on Patentability in PCT/US2010/029069 mailed Oct. 11, 2011.
International Search Report and Written Opinion in PCT/US2010/029069 (International Publication No. WO 2010/117731 A2), dated Oct. 26, 2010.
International Search Report of PCT Application No. PCT/US2010/028421, date of mailing Dec. 17, 2010—9 pages.
Notice of Allowance in U.S. Appl. No. 12/969,488, dated Dec. 28, 2011.
Office Action in Chinese Application No. 200880110582.1 dated Jul. 12, 2011.
Office Action in Chinese Application No. 200880111594.6 dated Jan. 31, 2011.
Office Action in U.S. Appl. No. 12/327,666, dated Sep. 15, 2011.
Office Action in U.S. Appl. No. 12/753,536, dated Apr. 28, 2011.
Response to Restrictions Requirements in U.S. Appl. No. 12/753,536, dated Mar. 4, 2011.
Restriction Requirement in U.S. Appl. No. 12/327,666, dated Jul. 5, 2011.
Restrictions Requirements in U.S. Appl. No. 12/753,536, dated Feb. 2, 2011.
Office Action in Japanese Application No. 2010-528925 mailed Aug. 20, 2013.
Office Action in Chinese Application No. 200880110582.1 dated Jun. 23, 2011.
Office Action in Chinese Application No. 200880110582.1 dated Feb. 26, 2013.
Office Action in Taiwan Application No. 097137750 dated Nov. 7, 2013.
First Office Action in Australia Application No. 2008331642 dated Mar. 22, 2013.
Office Action in Chinese Application No. 200880111594.6 dated May 13, 2013.
Office Action in Japanese Patent Application No. 2010-536971, dated May 14, 2013.
Office Action in Japanese Patent Application No. 2010-536972, dated May 21, 2013.
First Office Action in Australia Application No. 2008331643 dated Feb. 19, 2013.
Notice of Allowance in Chinese Application No. 200880118070.X dated Apr. 1, 2013.
Office Action in European Application No. 10762108.8 dated Apr. 10, 2013.
Office Action in European Application No. 10762108.8 dated Oct. 24, 2013.
Office Action in Australia Application No. 20100234963 dated May 24, 2013.
Office Action in Chinese Application No. 201080016155.4 dated Jul. 3, 2013.
First Office Action in Japanese Application No. 2012-504699 dated Dec. 10, 2013.
Exam Report in Australian Application No. 2010234888 dated Dec. 4, 2013.
Office Action in Chinese Patent Application No. 201080016154.X dated Jun. 6, 2013.
Office Action in Japanese Application No. 2012-504706 dated Dec. 10, 2013.

\* cited by examiner

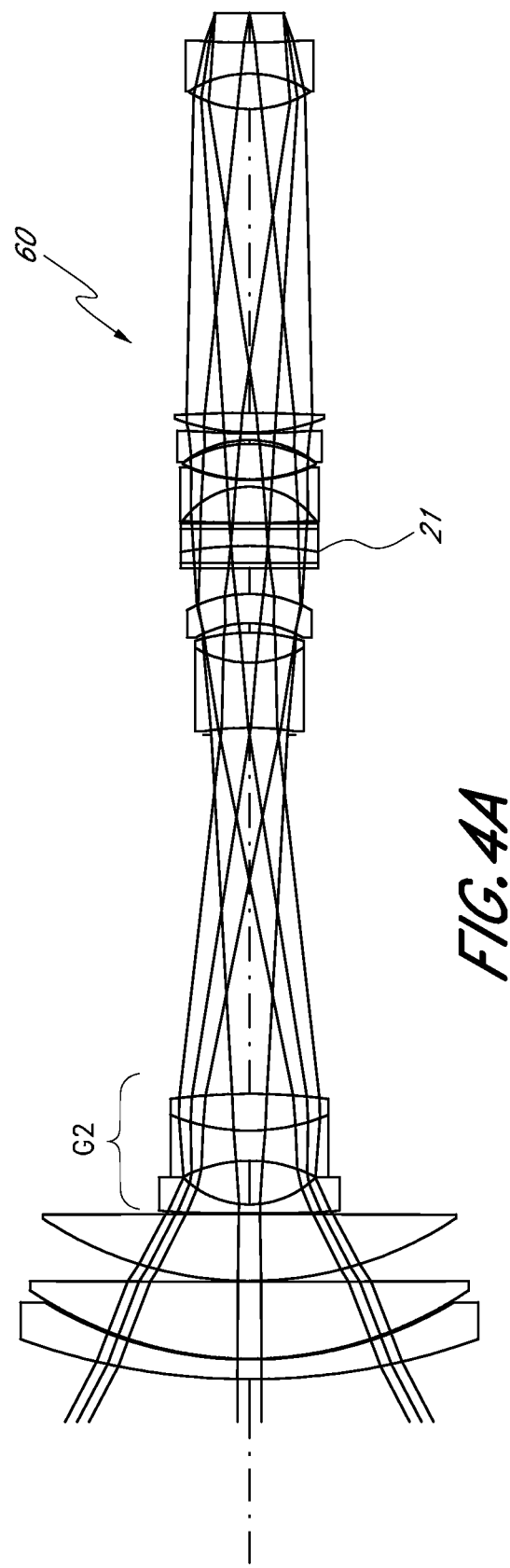

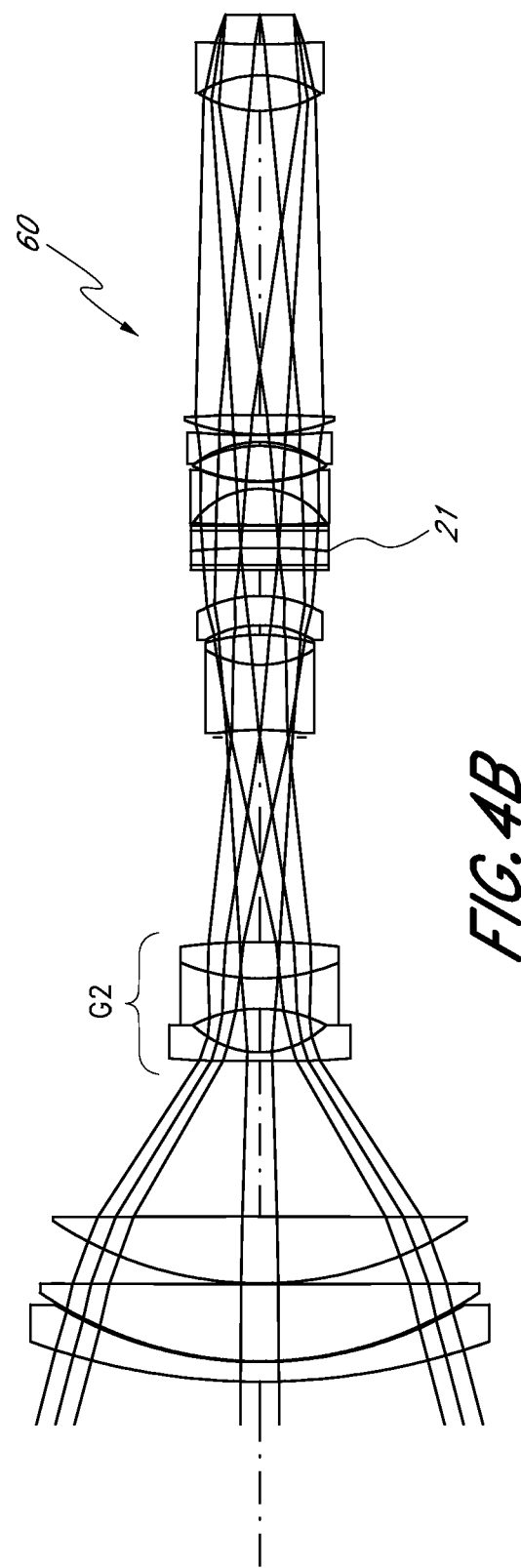

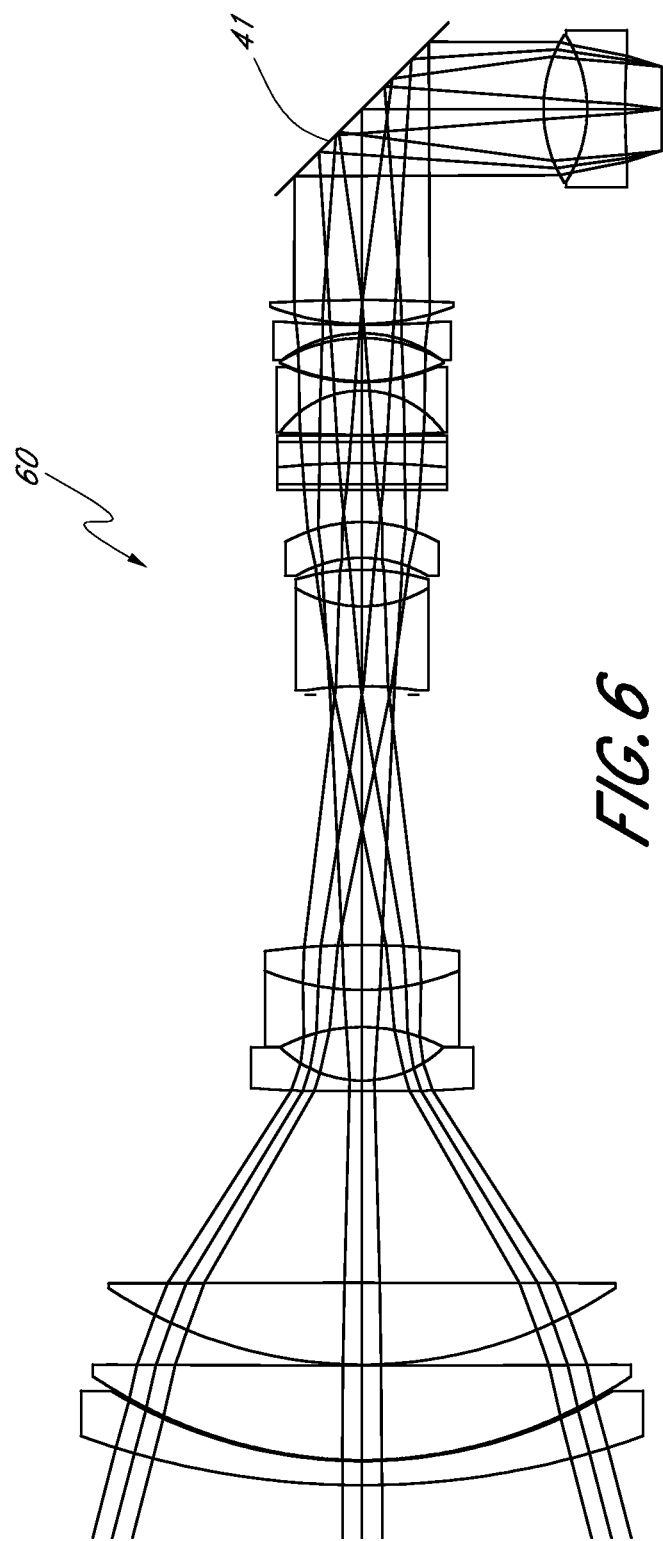

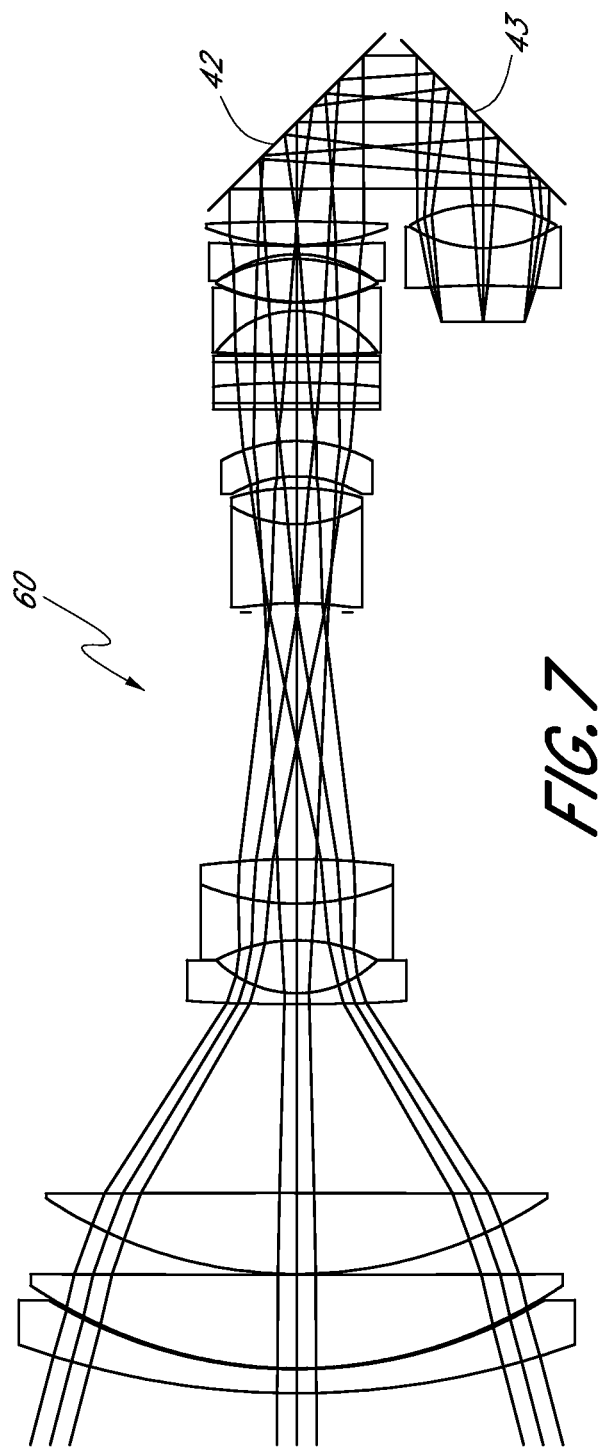

LIQUID OPTICS WITH FOLDS LENS AND IMAGING APPARATUS

RELATED APPLICATIONS

This application is related to, and claims the benefit of U.S. Provisional 60/992,244 filed Dec. 4, 2007, the entirety of which is hereby incorporated by reference herein and made a part of the present specification.

BACKGROUND

1. Field of the Invention

This invention relates to an optical lens system employing liquid optics and redirection of a radiation axis.

2. Description of the Related Art

Imaging applications have historically used two or more movable zoom lens groups to provide zooming and different focal lengths. An additional lens group for focusing may also be needed.

However, there are intrinsic disadvantages associated in using zoom and focus lens systems with moving lens groups. In particular, having moving zoom lens groups implies the need for complex mechanically moving parts. Each movable lens group requires support structures and drive mechanics such as cams and motors and in some cases control electronics to facilitate the movements. This system complexity may add size, weight and cost and may make the system operation unreliable over a period of time. These disadvantages together with undesirable limitations, such as a limited range of focal lengths, the inability to focus adequately over the entire focal length range, the inability to focus on close objects, the lack of adequate optical performance over the entire focal length range and focus distance, are present in some previously available zoom lenses having at least two moving zoom lens groups. A mechanically less complex but high performance zoom lens system is needed.

SUMMARY

Liquid lens cells comprise two or more fluids in a chamber. The fluids contact to form a surface that variable by, for example, electrical nodes. A fluid may be, for example, one or more gases, one or more liquids, or a mixture of one or more solids and one or more liquids. Using liquid lens cells to replace one or more moving lens groups results in additional configuration options for the optical path. Replacing moving lens groups with liquid lens cells results in a more compact system. However, a linear optical design may result in a lens that is longer than desired. The use of liquid lens cells instead of a moving group facilitates the use of optical elements such as folds to reduce the physical length of a lens. Although the overall length of the optical path through the lens may remain the same, the liquid lens cells provide strategic space for redirection of the radiation axis that reduces the length in one or more directions. This allows longer overall lens lengths to be used in smaller camera packages. For example, many point and shoot cameras and cell phone cameras do not have large amounts of space for a long lens. Using liquid cells in combination with folds or redirection of the radiation axis allows for better lens systems in these small camera packages. Larger cameras can also benefit from reducing the camera package length that would be required for a lens system that do not redirect the radiation axis.

It should be understood that the embodiments described herein are for explanation purposes, and the scope of the invention is not constrained to the described embodiments.

BRIEF DESCRIPTION OF THE DRAWINGS

FIGS. 4A, 4B and 4C are optical diagrams of the zoom lens system of FIG. 2 illustrating different positions of the zoom lens groups and surface shapes between the liquids to produce different focal lengths and focus distances.

FIG. 6 is an optical diagram of a zoom lens system employing liquids and a single fold.

FIG. 7 is an optical diagram of a zoom lens system employing liquids and a dual fold.

DETAILED DESCRIPTION

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the invention.

U.S. Provisional Patent Application No. 60/783,338 filed on Oct. 8, 2007 and titled "Liquid Optics Zoom Lens and Imaging Apparatus," herein incorporated by reference in its entirety, discloses a zoom lens system that employs liquid optics to provide zoom and focus functionality. The use of liquid optics for zooming and focusing provides for alternative lens configurations with redirection of the radiation axis. An exemplary zoom lens system employing liquid optics to provide zoom and focus functionality is described first, followed by embodiments employing redirection of the radiation axis.

Liquid Optics In a Zoom Lens System

Figure 1:
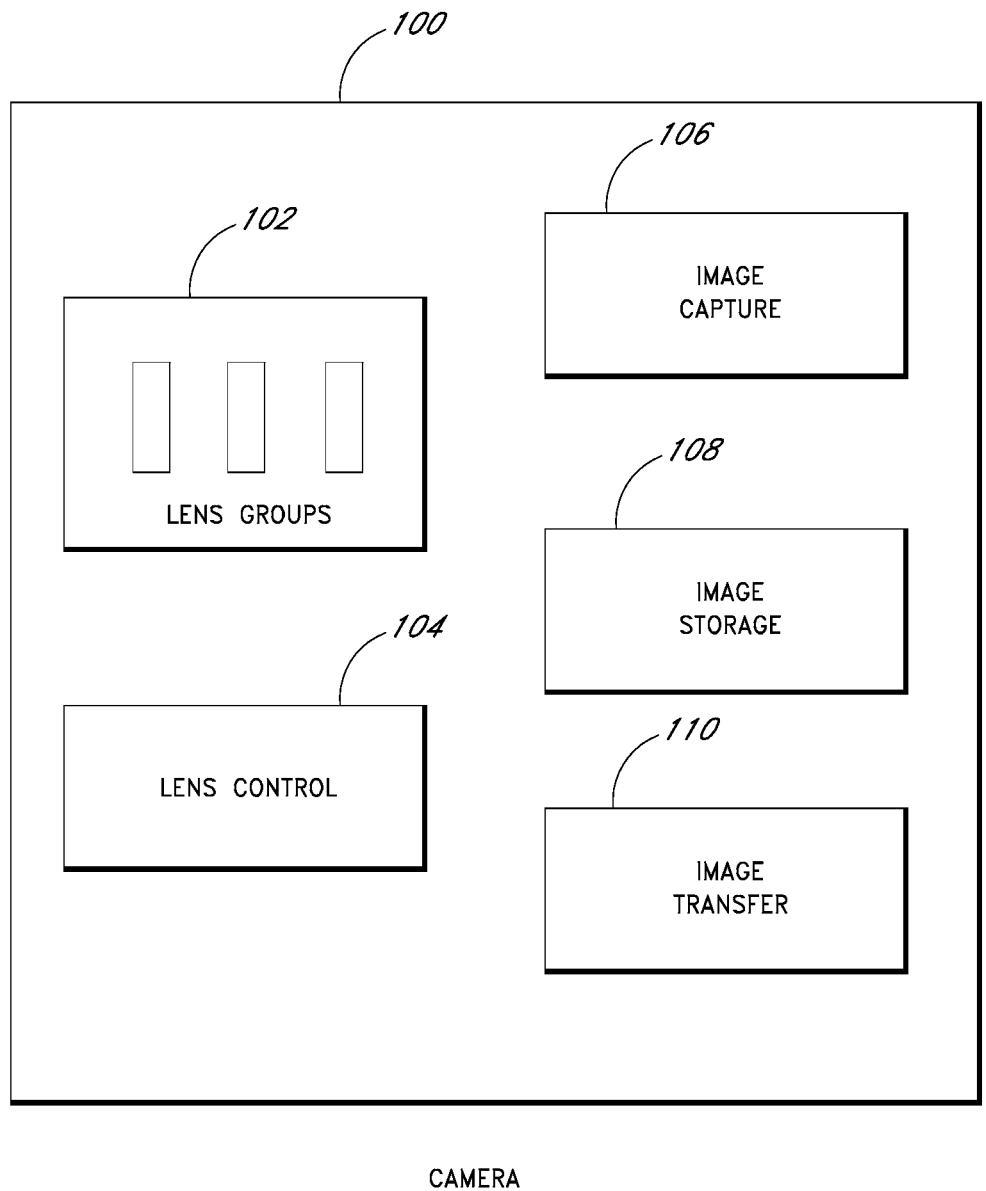
FIG. 1 is a block diagram of a camera.

FIG. 1 illustrates a block diagram of a camera 100 with a zoom lens 102. A zoom lens is an assembly of lens elements with the ability to vary focal length. The individual lens elements may be fixed in place, or slide axially along the body of the lens. A lens group may consist of one or more lens elements. At least one movable lens group provides variation of the magnification of an object. As the at least one lens group moves to accomplish magnification, the position of the focal plane may also move. At least one other movable lens group may move to compensate for the movement of the focal plane to maintain a constant focal plane position. Compensation for the movement of the focal plane may also be achieved mechanically by moving the complete lens assembly as the magnification of the lens changes.

The individual lens elements may be constructed from solid-phase materials, such as glass, plastic, crystalline, or semiconductor materials, or they may be constructed using liquid or gaseous materials such as water or oil. The space between lens elements could contain one or more gases. For example normal air, nitrogen or helium could be used. Alternatively the space between the lens elements could be a vacuum. When "Air" is used in this disclosure, it is to be understood that it is used in a broad sense and may include one or more gases, or a vacuum.

A zoom lens will often have three or more moving lens groups to achieve the zoom and focusing functions. A mechanical cam may link two movable lens groups to perform zooming, and a third movable lens group may be used for focus.

The zoom range is determined in part by the range of movement for the movable lens elements. Greater zoom ranges require additional space for movement of the lens elements. One or more of the movable lens groups may be replaced by a lens group that implements liquid cell technology. Because liquid cells do not require space for axial movement, the length of the lens design which contains the movable lens groups may be reduced. Alternatively, the space that would have been used for axial movement of the movable lens groups can be used to include additional optical elements or folds. Although a liquid cell does not require space for movement, it may be part of a movable lens group.

A liquid cell may be used for both zooming and focusing. In one embodiment, a movable lens group is used with a lens group that implements liquid cell technology. There is no need for a mechanical cam with one movable lens group. Not having a cam allows for additional movements.

One or more movable lens groups are used with one or more liquid cells to achieve zooming and focusing. A single movable lens group and a single liquid cell can perform both zooming, focusing and compensation for thermal effects. In one implementation, a zoom system has at least a first and second lens group. The first lens group is relatively high power, and the second lens group is relatively low power, the lens power being equivalent to the inverse of the focal length of the lens. The first lens group comprises conventional glass or other solid lenses and the second lens group comprises at least one liquid lens.

A liquid cell uses two or more liquids to form a lens. The focal length of the lens is partly determined by the angle of contact between the liquids and the difference in the refractive index of the liquids. The range of power variation is limited by the difference in the refractive index of the liquids employed and the finite range of radius of curvature at the surface interface between the liquids due to space constraints. U.S. Patent Application Publication No. 2006/0126190, herein incorporated by reference, discloses a lens employing the deformation of a drop of liquid through electrowetting.

Presently contemplated liquid lens systems will have a difference in refractive index of at least about 0.2, preferably at least about 0.3, and in some embodiments at least about 0.4. Water has a refractive index of about 1.3, and adding salt may allow varying the refractive index to about 1.48. Suitable optical oils may have a refractive index of at least about 1.5. Even by utilizing liquids with higher, lower or higher and lower refractive indices, for example a higher refractive index oil, the range of power variation remains limited. This limited range of power variation usually provides less magnification change than that of a movable lens group. Therefore, in a simple zoom lens system, to provide zooming while maintaining a constant image plane position most of the magnification change may be provided by one movable lens group and most of the compensation of defocus at the image plane during the magnification change may be provided by one liquid cell. However, it should be noted that more movable lens groups or more liquid cells, or both, may be utilized.

The movable lens group can have a positive or negative power. The liquid cell can have a range of variable power where the power is always positive, always negative or goes from positive to negative, or vice versa. Proper arrangement of the movable lens group and the liquid cell provides an extended zoom ratio of greater than 2× and preferably greater than 3× while offering good image quality throughout the zoom range. The arrangement, in addition to zooming, may also provide focusing at different object distances over an extended focus range by utilizing additional available power variation from the liquid cell, the movable lens group or both. This additional power variation provided by the liquid cell or the movable lens group or both for focusing is readily available. Since one movable lens group does not necessarily require a cam with a fixed locus of movement, the position of the movable zoom lens group can be adjusted for zooming and focusing. High performance imaging is achieved by utilizing both the movable zoom lens group and the liquid cell for zooming and focusing.

It is also possible to replace the movable zoom lens group with at least one liquid cell. This would increase the complexity of the optical system and may cause the optical system to have other disadvantages, such as reduced magnification change.

FIG. 1 also illustrates a lens control module 104 that controls the movement and operation of the lens groups in lens 102. The control module 104 includes electronic circuitry that controls the radius of curvature in the liquid lens cell. Electronic circuitry may also control the position of the movable lens group. The appropriate electronic signal levels for various focus positions and zoom positions can be determined in advance and placed in a lookup table. Alternatively, analog circuitry or a combination of circuitry and a lookup table can generate the appropriate signal levels. In one embodiment, a polynomial is used to determine the appropriate electronic signal levels. Points along the polynomial could be stored in a lookup table or the polynomial could be implemented with circuitry.

Thermal effects may also be considered in the control of the radius of curvature of surface between the liquids or the position of movable lens groups or both. The polynomial or lookup table may include an additional variable related to the thermal effects.

The control module 104 may include preset controls for specific zoom settings or focal lengths. These settings may be stored by the user or camera manufacturer.

FIG. 1 further illustrates an image capture module 106 that receives an optical image corresponding to an external object. The image is transmitted along an optical axis through the lens 102 to the image capture module 106. The image capture module 106 may use a variety of formats, such as film (e.g., film stock or still picture film), or electronic image detection technology (e.g., a CCD array, CMOS device or video pickup circuit). The optical axis may be linear, or it may include folds or other redirection of the radiation axis. It should be understood that a fold as used herein is intended to be interpreted broadly. A variety of optical elements are available that redirect the radiation axis, and the scope of the invention should not be limited to a specific type of optical element.

Image storage module 108 maintains the captured image in, for example, on-board memory or on film, tape or disk. In one embodiment, the storage medium is removable (e.g., flash memory, film canister, tape cartridge or disk).

Image transfer module 110 provides transferring of the captured image to other devices. For example, the image transfer module 110 may use one or a variety of connections such as a USB port, IEEE 1394 multimedia connection, Ethernet port, Bluetooth wireless connection, IEEE 802.11 wireless connection, video component connection, or S-Video connection.

The camera 100 may be implemented in a variety of ways, such as a video camera, a cell phone camera, a digital photographic camera, or a film camera.

Figure 2:
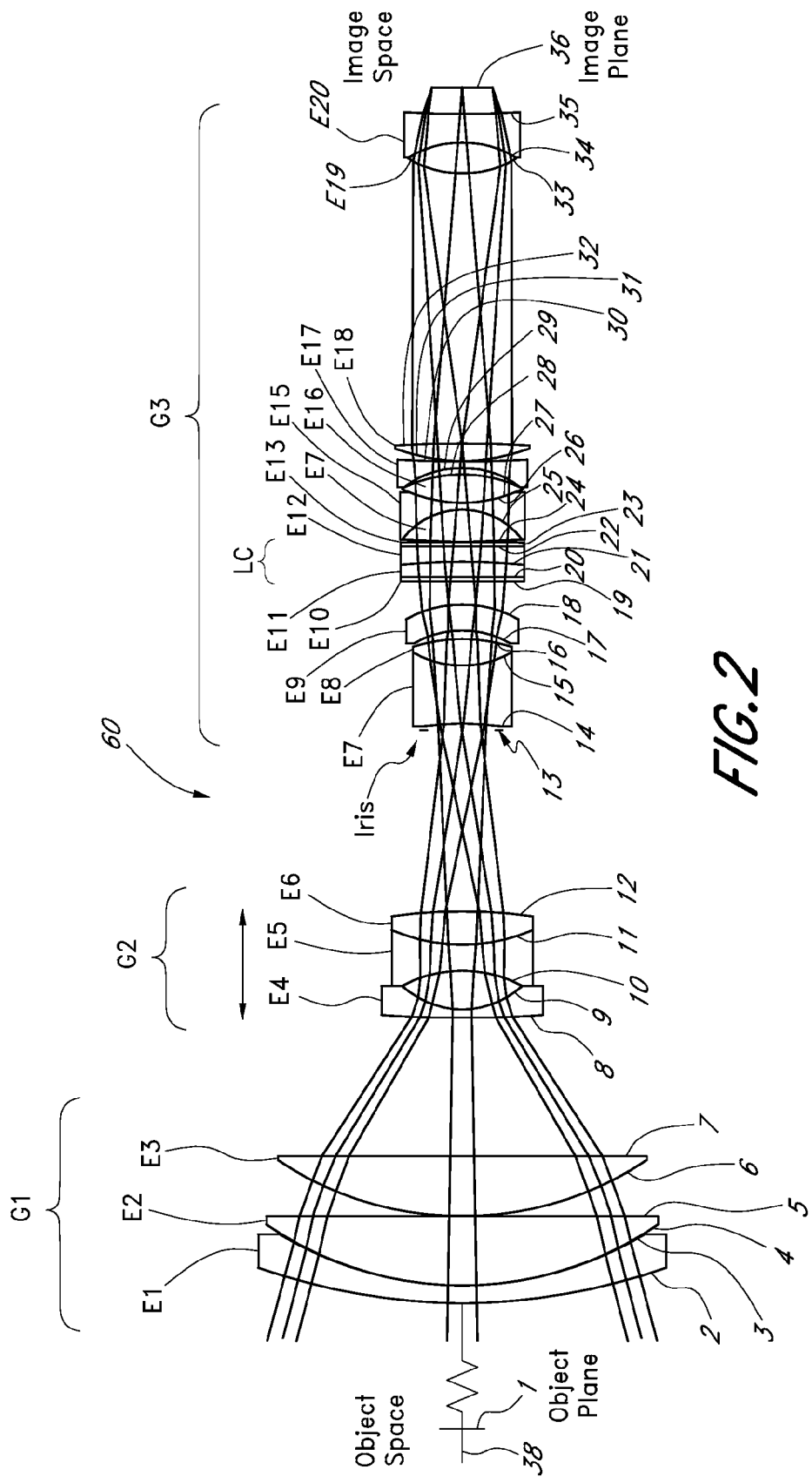
FIG. 2 is an optical diagram of a zoom lens system employing liquids.

An embodiment of a zoom lens will now be described by way of a design example. Referring first to FIG. 2, each lens element is identified by the letter "E" followed by a numeral from 1 through 20 and the general configuration of each lens element is depicted, but the actual radius of each lens surface is set forth below in TABLE 1. The lens, object, stop or iris and image surfaces are identified by a numeral from 1 through 36. The three lens groups are identified in FIG. 2 by the letter "G" followed by a numeral from 1 through 3 and the liquid lens cell is identified by the letters "LC" and comprises optical surfaces 19 through 23. The optical axis is identified in FIG. 2 by a numeral 38.

Each lens element has its opposite surfaces identified by a separate but consecutive surface number as, for example, lens element E1 has lens surfaces 2 and 3, lens element E9 has lens surfaces 17 and 18 and so forth, as shown in FIG. 2. The location of the object to be imaged, particularly as it relates to focus distance, is identified by a vertical line and the numeral 1 on the optical axis 38 and the real image surface is identified by the numeral 36. All of the lens surfaces are spherical or plano except lens surfaces 4 and 8 which are aspheric surfaces that are non-spherical, non-plano but rotationally symmetrical about the optical axis.

Before describing the detailed characteristics of the lens elements, a broad description of the lens groups and their axial positions and movement, and, the liquid lens cell and the variation in surface shape of contacting liquids will be given for the zoom lens system 60.

The positive or negative power of each lens group is defined as the inverse of the focal length. The resultant optical power of each group of lenses is as follows: the objective lens group G1 is positive, the zoom lens group G2 is negative and the rear lens group G3 is positive, from a lower positive value to a higher positive value as the shape of the surface in the liquid cell is varied. The horizontal arrow with arrowheads on both ends in the upper portion of FIG. 2 indicates that the zoom lens group G2 is movable in both axial directions.

While only the lens elements are physically shown in FIG. 2, it is to be understood that mechanical devices and mechanisms are provided for supporting the lens elements and for causing axial movement of the movable zoom lens group in a lens housing or barrel. In addition, it is to be understood that electronic circuitry changes the profile of the variably shaped optical surface in the liquid lens cell.

The lens construction and fabrication data for the above described zoom lens system 60 is set forth below in TABLE 1. The data in TABLE 1 is given at a temperature of 25° C. (77° F.) and standard atmospheric pressure (760 mm Hg). Throughout this specification measurements are in millimeters (mm) with the exception of wavelengths which are in nanometers (nm). In TABLE 1, the first column "Item" identifies each optical element and each location, i.e. object plane, image plane, etc., with the same numeral or label as used in FIG. 2. The second column identifies the "Group" to which that optical element (lens) belongs with the same numerals used in FIG. 2. The third column "Surface" is a list of the surface numbers of the object (line "1" in FIG. 2 and "Object" in TABLE 1), the Stop (iris) 13 and each of the actual surfaces of the lenses, as identified in FIG. 2. The fourth column "Focus Position" identifies three typical focus positions (F1, F2 and F3) for the zoom lens system 60 wherein there are changes in the distance (separation) between some of the surfaces listed in the third column and there are changes in the radius of curvature of the surface 21 listed in the third column, as described below more thoroughly. The fifth column "Separation" is the axial distance between that surface (third column) and the next surface. For example, the distance between surface S2 and surface S3 is 1.725 mm.

The sixth column, headed by the legend "Radius of Curvature," is a list of the optical surface radius of curvature for each surface, with a minus sign (−) meaning the center of the radius of curvature is to the left of the surface, as viewed in FIG. 2 and "Infinity" meaning an optically flat surface. The asterisk (*) for surfaces 4 and 8 indicate these are aspheric surfaces for which the "radius of curvature" is a base radius. Use of aspherical surfaces provides for the correction of aberrations in the zoom lens while enabling a smaller overall size and a simpler configuration. The formula and coefficients for the surface profiles of aspheric surfaces 4 and 8 are governed by the following equation:

$$z = \frac{cy^2}{1 + [1 - (1+\kappa)c^2 y^2]^{1/2}} + Ay^4 + By^6 + Cy^8 + Dy^{10} + Ey^{12} + Fy^{14}$$

where:
c=surface curvature (c=1/r where r is the radius of curvature)
y=radial aperture height of surface measured from the X and Y axis, where:

$y=(X^2+Y^2)^{1/2}$

κ=conic coefficient
A, B, C, D, E, F=$4^{th}$, $6^{th}$, $8^{th}$, $10^{th}$, $12^{th}$ and $14^{th}$, respectively, order deformation coefficients
z=position of a surface profile for a given y value or measured along the optical axis from the pole (i.e., axial vertex) of the surface The coefficients for surface 4 are:
κ=−0.6372
A=+0.9038×10$^{-6}$
B=+0.2657×10$^{-8}$
C=−0.1105×10$^{-10}$
D=+0.4301×10$^{-13}$
E=−0.8236×10$^{-16}$
F=+0.6368×10$^{-19}$ The coefficients for surface 8 are:
κ=+0.0000
A=+0.5886×10$^{-4}$
B=−0.5899×10$^{-6}$
C=+0.8635×10$^{-8}$
D=−0.5189×10$^{-10}$
E=−0.1186×10$^{-11}$
F=+0.1631×10$^{-13}$ Columns seven through nine of TABLE 1 relate to the "Material" between that surface (third column) and the next surface to the right in FIG. 2, with the column "Type" indicating whether there is a lens (Glass) or empty space (Air) or liquid lens (Liquid) between those two surfaces. The glass and liquid lenses are identified by optical glass or liquid in the column "Code". For convenience, all of the lens glass has been selected from glass available from Ohara Corporation and the column "Name" lists the Ohara identification for each glass type, but it is to be understood that any equivalent, similar or adequate glass may be used. Also, the lens liquid of oil has been selected from a liquid available from Cargille Laboratories, Inc., and water is commonly available from various sources, but it is to be understood that any equivalent, similar or adequate liquid may be used. The water liquid at surface 20 has the following refractive indices 1.331152, 1.332987, 1.334468 and 1.337129 at respective wavelengths 656.27, 589.29, 546.07 and 486.13 nanometers. The oil liquid at surface 21 has the following refractive indices 1.511501, 1.515000, 1.518002 and 1.523796 at respective wavelengths 656.27, 589.29, 546.07 and 486.13 nanometers.

The last column of TABLE 1 headed "Aperture Diameter" provides the maximum diameter for each surface through which the light rays pass. All of the maximum aperture diameters, except for the Stop surface 13, are given at a wavelength of 546.1 nanometers for a maximum image diameter of about 6 mm and F-numbers of F/2.8 to F/4.0 at the Image Plane, for all Zoom and Focus Positions. The maximum aperture diameter of the Stop surface 13 is given in TABLE 1 at a wavelength of 546.1 nanometers and an F-number of F/2.8 at the Image Plane for Zoom Position Z1 and Focus Position F1. At the Image Plane 36, the Maximum Aperture Diameter is given as an approximate value.

Zoom lens system 60 is provided with an optical stop at the surface 13 which controls the diameter of the aperture through which light rays may pass at that point. The optical stop is the location at which a physical iris (or diaphragm) is located. The iris is located before the rear lens group G3 and is axially stationary with that lens group. Note that in FIG. 4A, the rim rays pass through the axis side of the tic marks of the optical stop surface 13 such that the zoom lens system has no vignetting of light beams at any field position, zoom position and focus position. However, note that the F-number varies through zoom and focus positions and the iris opens or closes accordingly. The diameter of the iris at zoom positions Z1-Z8 for focus position F1 is 6.71, 6.39, 5.96, 5.53, 5.18, 4.84, 4.63 and 4.61. This shows that the iris located at 13 should close as the focal length increases. As compared to focus position F1, the diameter of the iris at zoom positions Z1-Z8 for focus positions F2 and F3 changes by a small amount of less than 0.3 mm diameter to maintain the same F-numbers as for focus position F1.

Referring to TABLE 1, for illustrating the scope and versatility of the design there are eight different Zoom Positions

TABLE 1

Optical Prescription

| Item | Group | Surface | Focus Position | Separation | Radius of Curvature (mm) | Material Type | Name | Code | Aperture Diameter (mm) |
|---|---|---|---|---|---|---|---|---|---|
| Object | | 1 | F1 | Infinity | Infinity | Air | | | |
| | | | F2 | 1016.2500 | | | | | |
| | | | F3 | 378.7500 | | | | | |
| E1 | G1 | 2 | All | 1.7250 | 59.1716 | Glass | SLAM66 | 801350 | 37.161 |
| | | 3 | All | 0.0750 | 34.5954 | Air | | | 35.567 |
| E2 | G1 | 4 | All | 6.7565 | *33.0488 | Glass | SFPL51 | 497816 | 35.618 |
| | | 5 | All | 0.0750 | 2758.9929 | Air | | | 35.182 |
| E3 | G1 | 6 | All | 5.8657 | 32.7151 | Glass | SFPL53 | 439950 | 33.680 |
| | | 7 | F1 | TABLE 2 | −2981.4301 | Air | | | 33.034 |
| | | | F2 | TABLE 2 | | | | | |
| | | | F3 | TABLE 2 | | | | | |
| E4 | G2 | 8 | All | 0.7652 | *461.6464 | Glass | SLAH64 | 788474 | 14.273 |
| | | 9 | All | 3.8333 | 8.3339 | Air | | | 11.605 |
| E5 | G2 | 10 | All | 2.6582 | −12.6370 | Glass | SFPL53 | 439950 | 11.587 |
| E6 | G2 | 11 | All | 3.2165 | 18.1883 | Glass | SLAM66 | 801350 | 12.383 |
| | | 12 | F1 | TABLE 3 | −55.4718 | Air | | | 12.337 |
| | | | F2 | TABLE 3 | | | | | |
| | | | F3 | TABLE 3 | | | | | |
| Stop/Iris | G3 | 13 | All | 0.6371 | Infinity | | | | 6.708 |
| E7 | G3 | 14 | All | 5.7168 | −26.3844 | Glass | SLAH65 | 804466 | 6.757 |
| E8 | G3 | 15 | All | 2.6250 | 9.3177 | Glass | STIH53 | 847238 | 8.304 |
| | | 16 | All | 0.8432 | −16.3366 | Air | | | 8.533 |
| E9 | G3 | 17 | All | 2.5647 | −9.2859 | Glass | SLAH58 | 883408 | 8.508 |
| | | 18 | All | 2.2767 | −11.1961 | Air | | | 9.665 |
| E10 | G3 | 19 | All | 0.4500 | Infinity | Glass | SBSL7 | 516641 | 10.151 |
| E11 | G3 | 20 | All | 1.5000 | Infinity | Liquid | WATER | | 10.201 |
| E12 | G3 | 21 | F1 | 1.5000 | TABLE 4 | Liquid | OIL | T300 04091-AB | 10.367 |
| | | | F2 | | TABLE 4 | | | | |
| | | | F3 | | TABLE 4 | | | | |
| E13 | G3 | 22 | All | 0.4500 | Infinity | Glass | SBSL7 | 516641 | 10.584 |
| | | 23 | All | 0.0750 | Infinity | Air | | | 10.642 |
| E14 | G3 | 24 | All | 3.1583 | 120.2680 | Glass | SLAH65 | 804466 | 10.680 |
| E15 | G3 | 25 | All | 0.6000 | −7.2241 | Glass | STIH10 | 728285 | 10.724 |
| | | 26 | All | 0.0750 | 13.8153 | Air | | | 10.634 |
| E16 | G3 | 27 | All | 3.0844 | 13.7118 | Glass | SBSM10 | 623570 | 10.696 |
| | | 28 | All | 0.3424 | −11.1618 | Air | | | 10.713 |
| E17 | G3 | 29 | All | 0.6000 | −9.5071 | Glass | STIH13 | 741278 | 10.652 |
| | | 30 | All | 0.0750 | 68.8748 | Air | | | 11.180 |
| E18 | G3 | 31 | All | 1.7063 | 18.2078 | Glass | SLAL13 | 694532 | 11.589 |
| | | 32 | All | 26.6908 | −115.6915 | Air | | | 11.592 |
| E19 | G3 | 33 | All | 3.1085 | 10.2784 | Glass | SNPH1 | 808228 | 9.888 |
| E20 | G3 | 34 | All | 2.7193 | −9.9003 | Glass | SLAH58 | 883408 | 9.581 |
| | | 35 | All | 2.6192 | 58.0014 | Air | | | 7.805 |
| Image | | 36 | All | 0.0000 | Infinity | Air | | | 6.008 |

Z1, Z2, Z3, Z4, Z5, Z6, Z7 and Z8 and three different Focus Positions F1, F2 and F3 set forth in the data which, in effect, provides specific data for twenty four (8×3=24) different combinations of positions for the movable zoom lens group G2 and the variable shape optical surface 21.

The focal lengths of zoom lens system 60 for zoom positions Z1-Z8 at focus position F1, at a wavelength of 546.1 nanometers are; 5.89, 7.50, 11.25, 15.00, 18.75, 30.00, 41.25 and 45.00 mm, respectively. The corresponding F-numbers for the focal lengths for data positions Z1-Z8, at a wavelength of 546.1 nanometers are; 2.80, 2.90, 3.05, 3.25, 3.45, 3.70, 3.95 and 4.00, respectively.

For Focus Position F1 the Object Plane 1 is assumed to be at infinity, for F2 the Object Plane 1 is at an intermediate distance of about 1016.25 mm, and for F3 the Object Plane 1 is at a close distance of about 378.75 mm (i.e., 378.75 mm away from the image plane). At each of these three Focus Positions F1, F2 and F3, the lens groups G1 and G3 remain in the same position throughout the full range of movement of the zoom lens group G2. TABLES 2 and 3 provide separation values of surfaces 7 and 12 and TABLE 4 provides the radii of curvature of surface 21 for zoom positions Z1-Z8 and F1-F3.

Figure 3B:
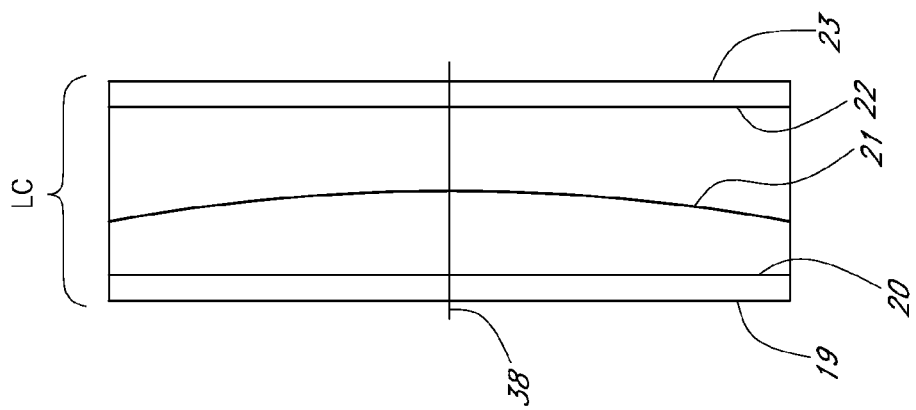
FIGS. 3A and 3B are optical diagrams of the liquid cell of the zoom lens system of FIG. 2 showing the surface shape between the liquids.
Figure 3A:
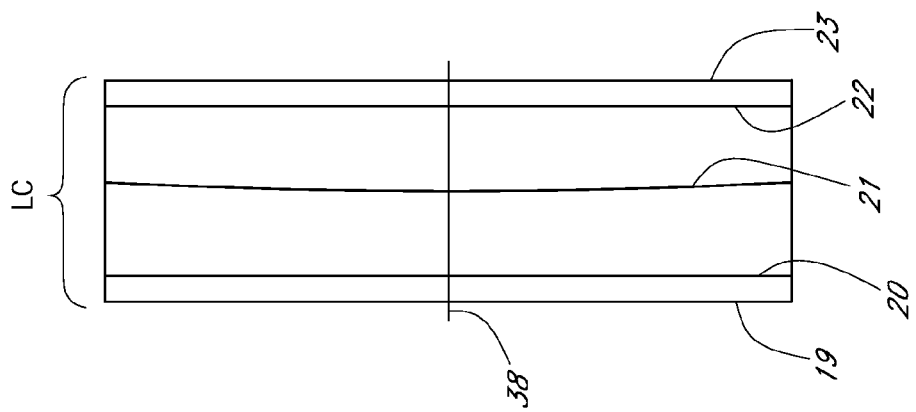

Z8 and focus position F3 respectively. The liquid cell LC of zoom lens system 60 is shown in FIGS. 3A and 3B, demonstrating the two extreme radii of curvature from TABLE 1 of the variable shape optical surface 21 between the liquids. In FIGS. 3A and 3B the two radii of curvature of surface 21 are about −33.99 and +115.80 mm respectively. The two extreme focal lengths of the liquid cell LC, in FIGS. 3A and 3B, are −185.20 and 630.97 mm respectively. This difference happens at zoom position Z1 and focus position F1, and, zoom position Z8 and focus position F3. In this embodiment the volume of the two liquids between surfaces 20, 21 and 21, 22 varies as the shape of the variable surface changes. However, it is also possible to maintain a constant volume for each liquid by applying small, equal but opposite, changes to the axial separation between surfaces 20, 21 and 21, 22.

Figure 4C:
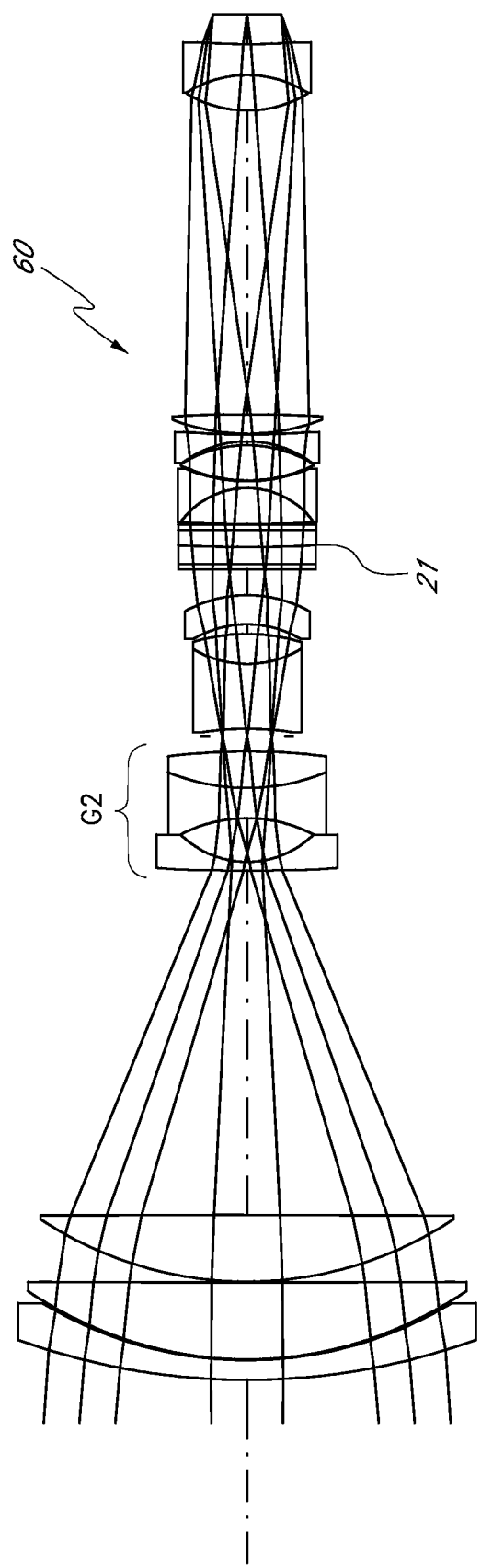

Referring now to FIGS. 4A, 4B, and 4C, the zoom lens system 60 is shown with the zoom lens group in various positions, the shape of the variable surface in the liquid cell in various positions and with light ray traces for those positions. FIG. 4A represents the focus position F1 and zoom position Z1 for which data is set forth above in TABLE 1 with infinity focus and a small focal length of about 5.9 mm. FIG. 4B

TABLE 2

Separation Values for Surface 7

| Surface | Focus | Z1 | Z2 | Z3 | Z4 | Z5 | Z6 | Z7 | Z8 |
|---|---|---|---|---|---|---|---|---|---|
| 7 | F1 | 0.0832 | 5.7132 | 13.7126 | 18.4633 | 21.6974 | 27.4007 | 30.5400 | 31.3096 |
| 7 | F2 | 0.0902 | 5.7486 | 13.6468 | 18.3289 | 21.5154 | 27.0776 | 30.0174 | 30.7361 |
| 7 | F3 | 0.0750 | 5.6942 | 13.4674 | 18.1217 | 21.3355 | 26.7467 | 29.5798 | 30.2701 |

TABLE 3

Separation Values for Surface 12

| Surface | Focus | Z1 | Z2 | Z3 | Z4 | Z5 | Z6 | Z7 | Z8 |
|---|---|---|---|---|---|---|---|---|---|
| 12 | F1 | 31.5294 | 25.8992 | 17.8996 | 13.1486 | 9.9140 | 4.2101 | 1.0701 | 0.3000 |
| 12 | F2 | 31.5178 | 25.8581 | 17.9590 | 13.2762 | 10.0892 | 4.5268 | 1.5870 | 0.8729 |
| 12 | F3 | 31.5324 | 25.9120 | 18.1380 | 13.4831 | 10.2689 | 4.8577 | 2.0248 | 1.3384 |

TABLE 4

Radii of Curvature for Surface 21

| Surface | Focus | Z1 | Z2 | Z3 | Z4 | Z5 | Z6 | Z7 | Z8 |
|---|---|---|---|---|---|---|---|---|---|
| 21 | F1 | −33.9902 | −40.9700 | −60.9667 | −84.8892 | −106.7630 | −101.7297 | −58.3998 | −48.6792 |
| 21 | F2 | −34.3890 | −42.0587 | −65.5384 | −101.1799 | −154.9184 | −370.2777 | −263.5374 | −212.3139 |
| 21 | F3 | −35.0134 | −43.6001 | −72.6330 | −133.7178 | −351.2333 | 214.4454 | 125.5481 | 115.8049 |

It will be understood that continuous focusing is available between the extreme Focus Positions F1 and F3, that continuous zooming is available between the extreme Zoom Positions Z1 and Z8, and that any combination of continuous focusing and zooming is available within the described focus and zoom ranges with the lens system 60.

The zoom lens system 60 shown in FIG. 2 and prescribed in TABLE 1 has focal lengths for lens groups G1 and G2 of 54.30 and −12.25 mm respectively. Also, lens group G3, due to the variable shape of the optical surface 21 between the liquids, has a variable focal length which has a minimum value of +30.18 mm and a maximum value of +38.97 mm at zoom position Z1 and focus position F1, and, zoom position represents the focus position F2 and zoom position Z3 from TABLE 1 with an intermediate focus and a focal length of about 11.3 mm. FIG. 4C represents the focus position F3 and zoom position Z8 from TABLE 1 with close focus and a focal length of about 44.8 mm.

FIGS. 4A, 4B and 4C show three axial locations of the zoom lens group G2 with corresponding three surface shapes for the variable optical surface 21 for the respective zoom and focus positions; Z1, F1 and Z3, F2 and Z8, F3.

Figure 5A:
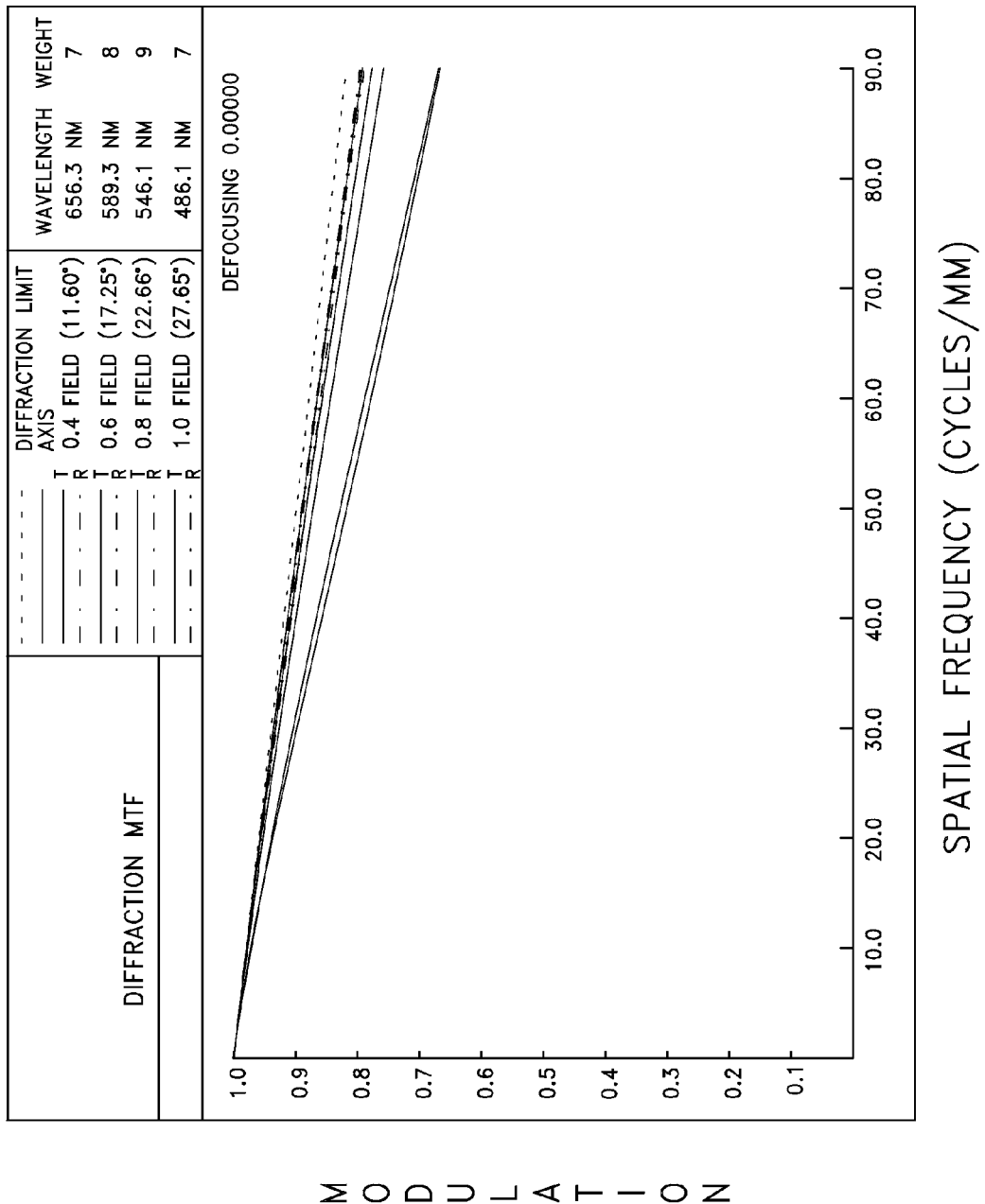
FIGS. 5A, 5B and 5C are modulation transfer function performance diagrams of the zoom lens system of FIGS. 4A, 4B and 4C.
Figure 5B:
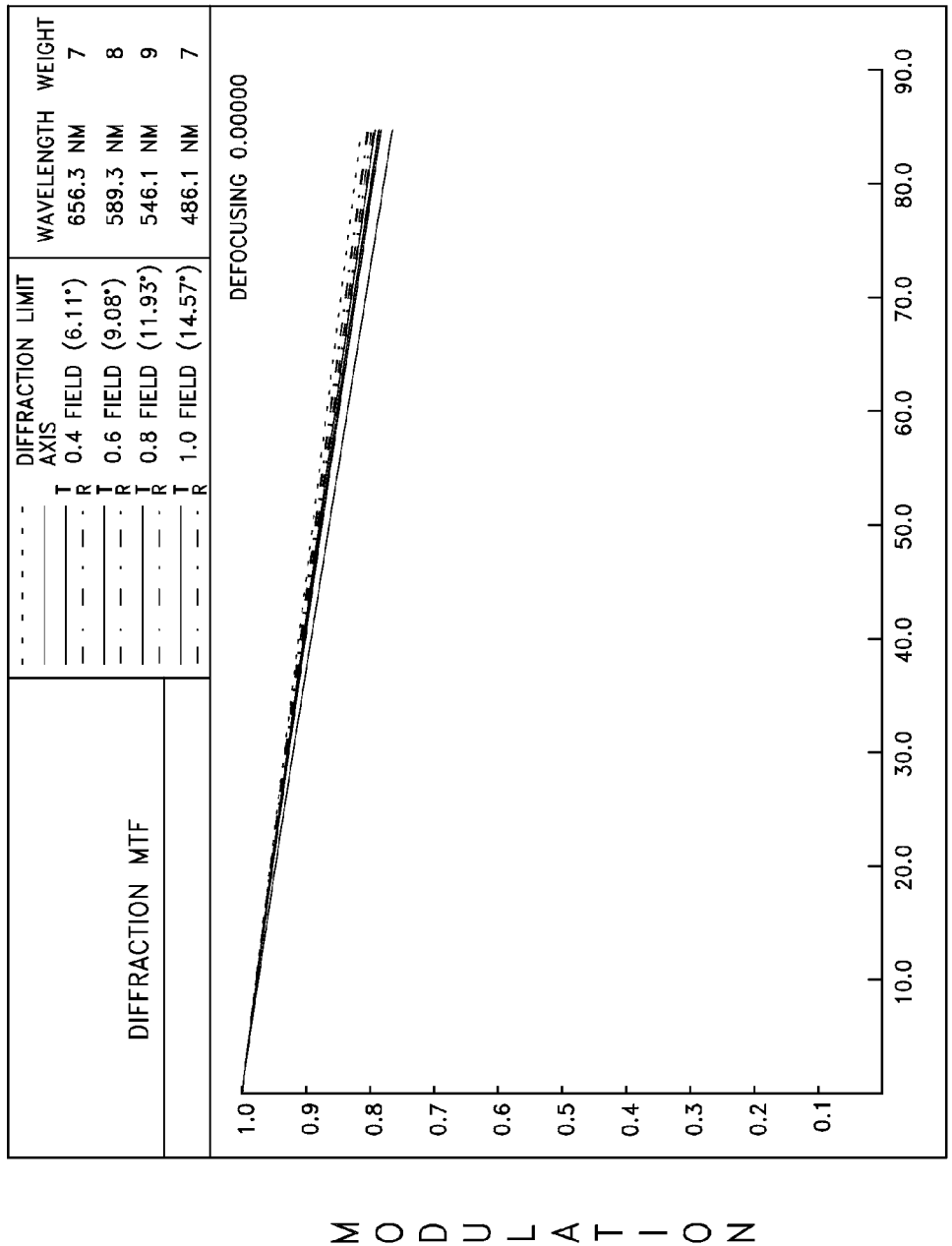
Figure 5C:
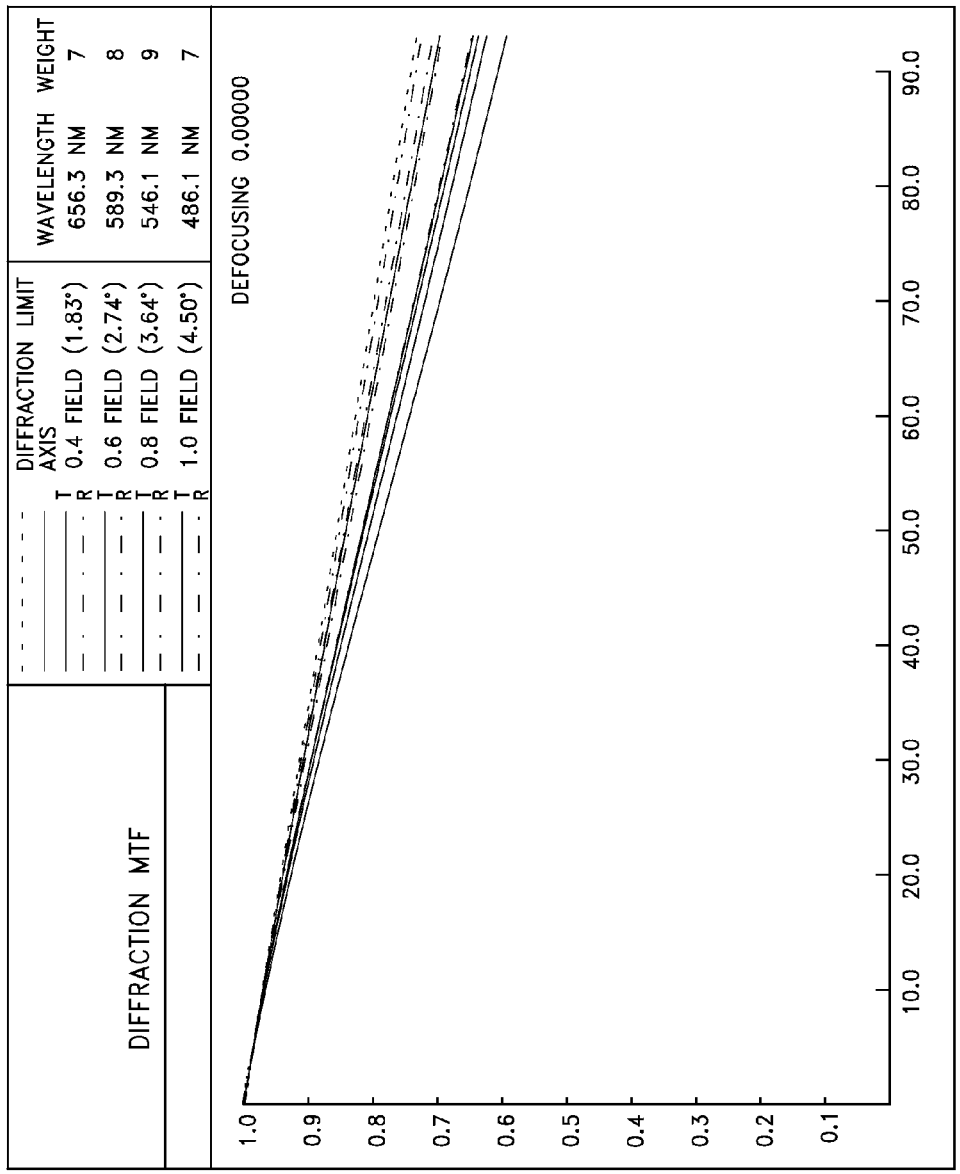

The optical performance of zoom lens system 60 is given in FIGS. 5A, 5B and 5C wherein the diffraction based polychromatic modulation transfer function ("MTF") data (modulation versus spatial frequency) is shown in percent (%) for five different Field Positions in three different combinations of the zoom and focus positions set forth in TABLE 1, namely (Z1, F1), (Z3, F2) and (Z8, F3) which are representative examples. The Field Positions are set forth in two values, both the normalized image height (mm) and the actual object space angle (degree) from the optical axis. The MTF percentages are at the wavelengths and weightings set forth in the top right-hand corner of FIGS. 5A, 5B and 5C and are graphically shown for tangential (T) and radial (R) directions of measurement at the image plane 36. Note that the tangential and radial values are equal at the axial field position (AXIS) and are depicted with only one plot. The maximum spatial frequency shown is 90 cycles/mm which given the image diameter of about 6 mm and choice of detector pixel size may provide high quality images at least up to high definition television (HDTV) resolution, namely 1920 pixels horizontally by 1080 pixels vertically. MTF at a spatial frequency is a relatively standard measurement of optical performance, wherein the value "90 cycles/mm" means 90 pairs of black and white lines per millimeter on a chart from which the clarity is determined. The highest MTF value is about 89% at the full radial field for zoom position Z1 and focus position F2. The lowest MTF value is about 58% at the full tangential field for zoom position Z8 and focus position F3. The minimum relative illumination is about 75% at zoom position Z1 and focus position F1. In general, higher relative illumination values are better, because a low number means that light is falling off in the corners of the picture. High full field relative illumination is preferred for state of the art detectors, which have a constant response to light in all areas and will faithfully reproduce shading in the corners of the image along with changes to the image during zooming. Illumination less than 50% may result in shading in an electronic detector, but will likely be acceptable for film. The highest positive distortion is +3.04% at zoom position Z3 and focus position F1 and the lowest negative distortion is −2.98% at zoom position Z1 and focus position F3. The so-called "breathing" problem of lenses in general (but which may be more prevalent in zoom lenses) wherein the image changes size from far to close focus is virtually absent in zoom lens system 60 at the short focal length of the zoom range where it is most noticeable due to the large depth of field. The lowest breathing is −0.2% at zoom position Z1 and focus position F3 and the highest breathing is −19.5% at zoom position Z8 and focus position F3. Breathing is the percentage change in maximum field angle from infinity focus to a selected focus. Accordingly, at infinity focus (F1), breathing is zero because that is the reference field of view.

All of the performance data is given at a temperature of 25° C. (77° F.), standard atmospheric pressure (760 mm Hg), and at the full apertures available in the zoom lens system 60. However, the zoom lens system 60 does provide substantially constant performance, as for example the MTF values, over a temperature range of 0° to 40° C. (32° to 104° F.) and, if a small degradation in performance (MTF) is acceptable, the operable temperature range can be extended to −10° to 50° C. (14° to 122° F.) or more. For a change temperature the optimum performance may be achieved by further axial adjustment of the zoom lens group G2 or further change of shape of the contacting optical surface 21 or a combination of both together. This may happen at all zoom and focus positions. At low temperatures of about 0° C. (32° F.) or below, to avoid freezing (forming a solid), the liquids may need to be heated or be replaced with doped liquids in a similar way to antifreeze being added to water in a car radiator for low temperature operation. However, note that these material temperature changes preferably should not significantly change the optical characteristics of the liquids.

While the described embodiment using zoom lens system 60 is of the appropriate dimensions for use with a 6 mm diameter (so called third inch chip sensor), the dimensions of this zoom lens system may be appropriately scaled up or down for use with various film and electronic detector image formats.

Liquid lens cells may have a limited clear aperture diameter. If a sufficiently small detector is used, the liquid lens cell may be located near the detector. Alternatively, the liquid lens cell may be located near an intermediate image where the light beam "waist" is sufficiently narrow. The liquid lens cell could be placed before the intermediate image, after the intermediate image, or liquid lens cells could be placed both before and after the intermediate image. The waist effect can happen near the stop or the iris. As shown in Table 2, the diameter at the iris is approximately 6.7 mm. Because of the small diameter at the stop or iris, it may be appropriate to place a liquid lens cell in the vicinity of the stop or iris.

Among the many advantages of the zoom lens system 60 is that of providing zooming over a wide range of focal lengths utilizing only one axially moving zoom lens group. The design of the zoom lens system 60 creates a high performance and mechanically less complex lens system than most conventional high performance zoom lens systems which require at least two axially movable zoom lens groups and corresponding mechanics. The unique lens design of the zoom lens system 60 provides focusing over a large region of focus distance without additional movable lens groups and corresponding mechanics. The disclosed design of zoom lens system 60 is exemplary, and other designs will fall within the scope of the invention. Other features and advantages of the zoom lens system 60 will appear to those skilled in the art from the foregoing description and the accompanying drawings.

Liquid Optics and Redirection of the Radiation Axis in a Zoom Lens System

Using liquid lens cells to replace one or more moving lens groups results in additional configuration options for the optical path. Replacing moving lens groups with liquid lens cells results in a more compact system. However, a linear optical design may result in a lens that is longer than desired. The use of liquid lens cells instead of a moving group facilitates the use of optical elements such as folds to redirect of the radiation axis reduce the physical length of a lens. Although the overall length of the optical path through the lens may remain the same, the liquid lens cells provide strategic space for folding that reduces the length in one or more directions. This allows longer overall lens lengths to be used in smaller camera packages. For example, many point and shoot cameras and cell phone cameras do not have large amounts of space for a long lens. Using liquid cells in combination with folds allows for better lens systems in these small camera packages. Larger cameras can also benefit from reducing the camera package length that would be required for a lens system that did not use folds.

FIG. 6 shows an optical diagram of a zoom lens system employing liquids and a single fold 41. The use of liquids instead of movable lens groups reduces the space requirements and provides additional options for strategic placement of airspaces for fold mirrors or prisms. This figure shows placement of folds where they will not interfere with moving lens groups.

Overall length of zoom lens system 60 may be reduced with some degradation in performance unless increased optical complexity such as more lens elements and/or aspherical surfaces are introduced. However, a reduced length may be achieved by folding of the zoom lens system. FIG. 6 shows a single 45 degree fold 41 in the large airspace in the rear lens group G3, to redirect the radiation path by 90 degrees.

FIG. 7 is an optical diagram of a zoom lens system employing liquids and a dual fold. FIG. 7 shows dual 45 degree folds 42 and 43 in the large airspace in the rear lens group G3, to redirect the radiation path two times by a total of 180 degrees so that the radiation has reversed direction. This arrangement may be preferred for packaging of the zoom lens system 60 in a camera box. Also, the zoom lens system may have a constant aperture of F/2.8 through all zoom and focus positions but to maintain about the same zoom lens system diameter, some vignetting may occur. In this case, some degradation of image quality may appear but may be partially corrected by re-optimization of the prescription of the zoom lens system. The zoom lens system may be arranged so that vignetting does not occur.

Figure 8A:
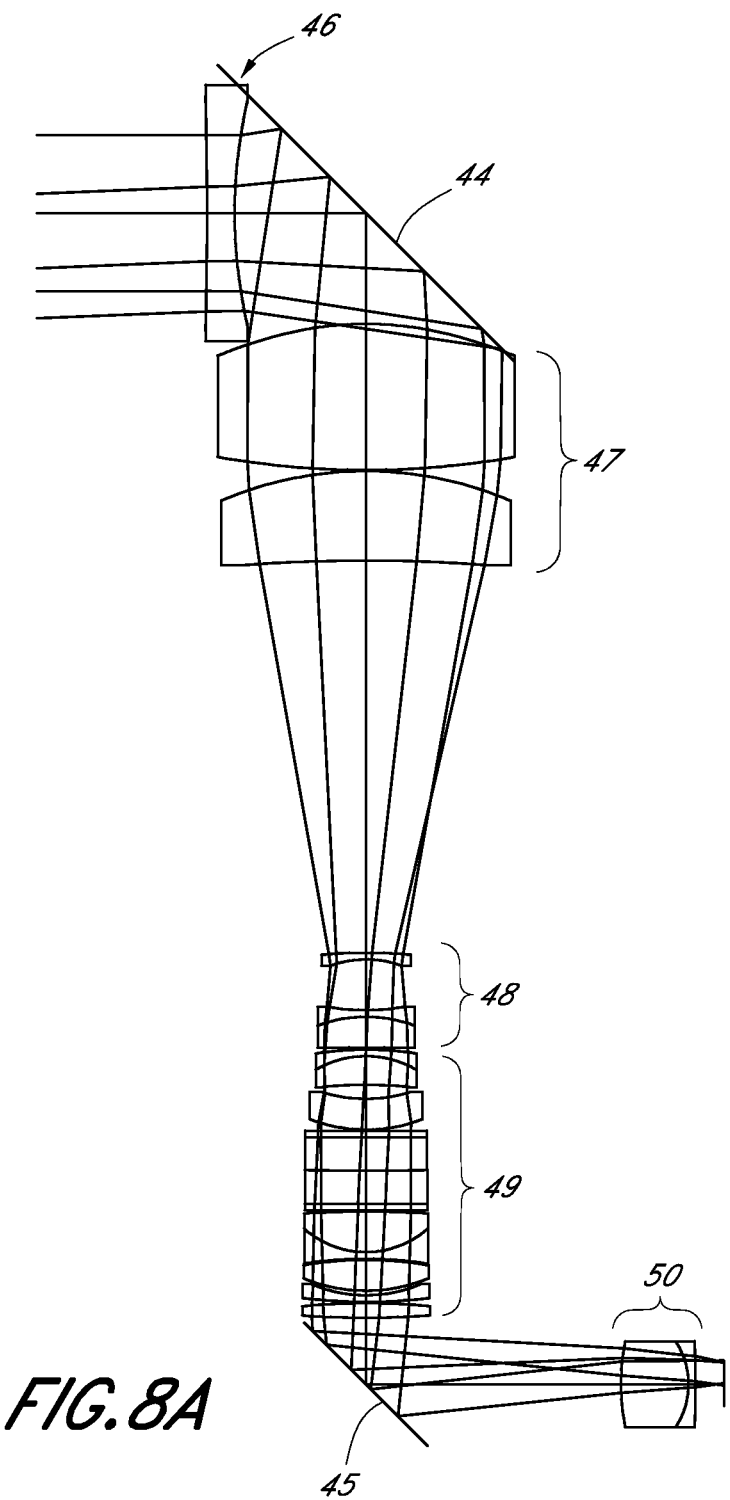
FIGS. 8A and 8B are optical diagrams of a zoom lens system with folds illustrating different positions of the zoom lens group and surface shapes between the liquids.
Figure 8B:
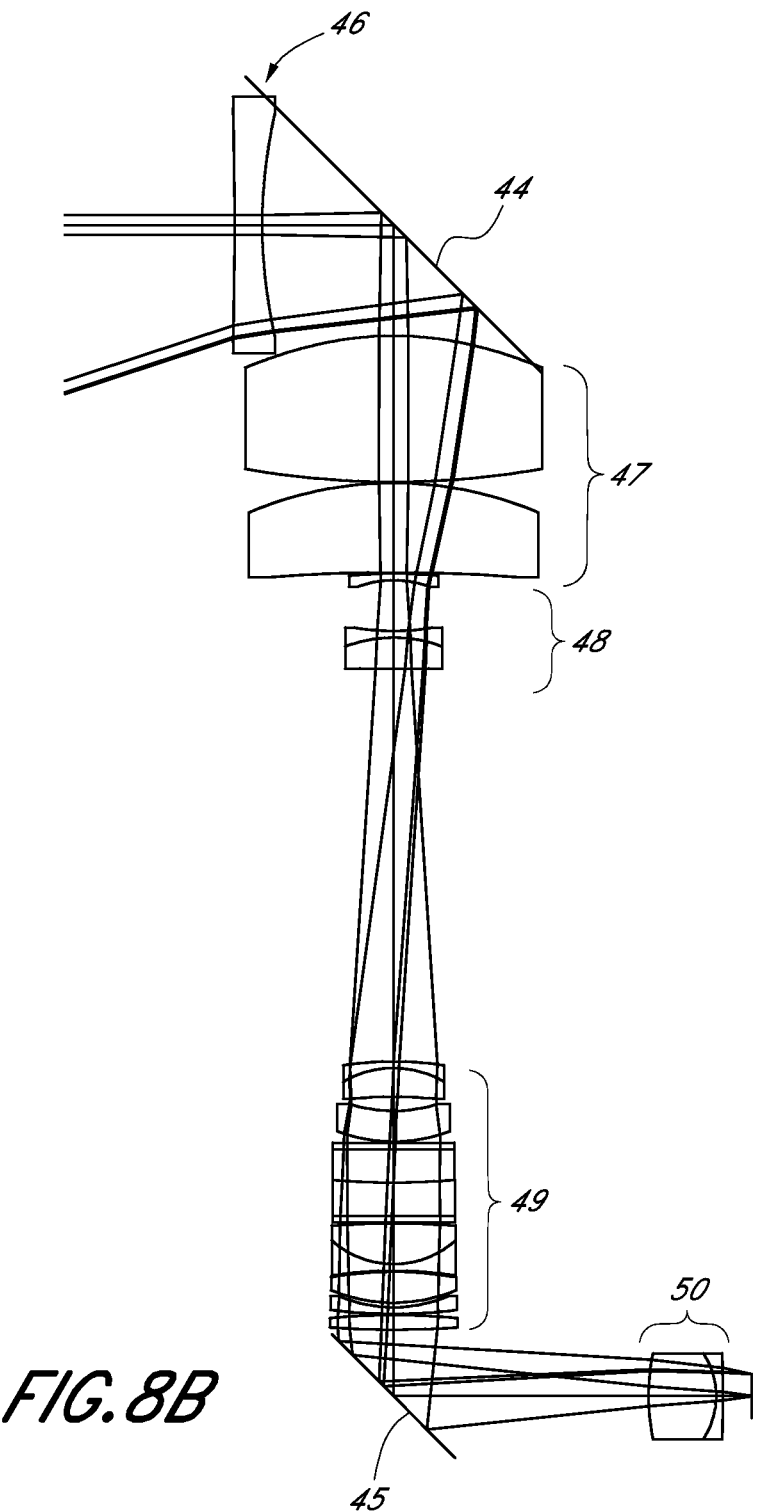

FIGS. 8A and 8B are optical diagrams of a zoom lens system illustrating redirection of the radiation axis with different positions of the zoom lens group and surface shapes between the liquids. This embodiment is illustrative of an alternative lens layout. FIG. 8A illustrates a zoom position that enlarges the image to a point that the optic traces exceed parameters of the lens system. This embodiment is illustrative of one design option, and minor changes could be made to the design to correct this effect.

Folds 44 and 45 are substantially parallel, so that light rays leaving lens elements 50 are substantially parallel to light rays entering the lens system through lens 46. Lens group 47 remains fixed, while lens group 48 moves to substantially provide zooming. Lens group 49 comprises a liquid lens cell that performs zooming and focusing functions.

Figure 9A:
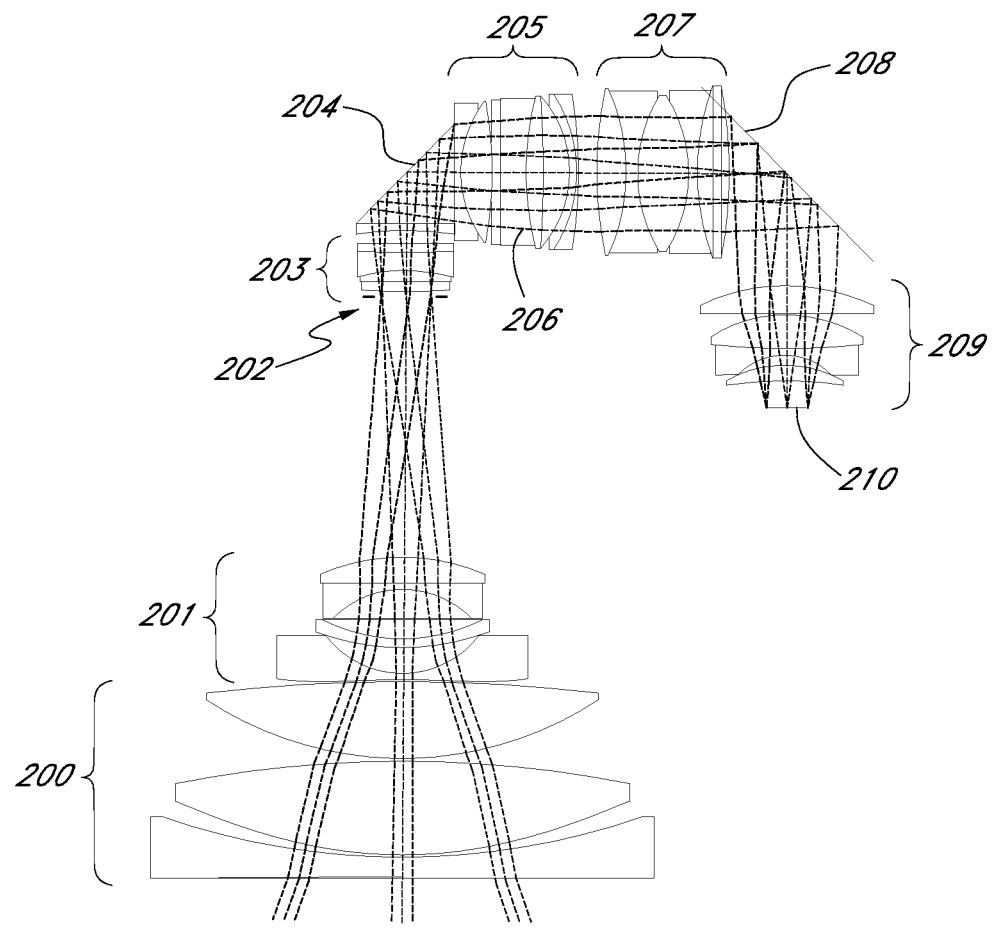
FIGS. 9A, 9B and 9C are optical diagrams of a zoom lens system illustrating redirection of the radiation axis with different positions of the zoom lens group and surface shapes between the liquids to produce different focal lengths and focus distances.
Figure 9B:
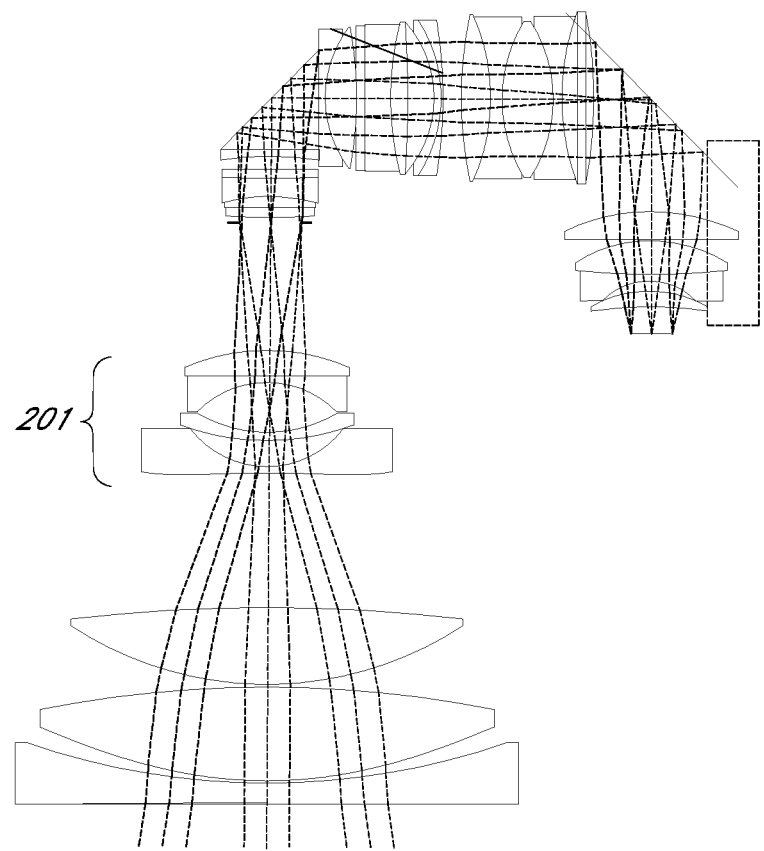
Figure 9C:
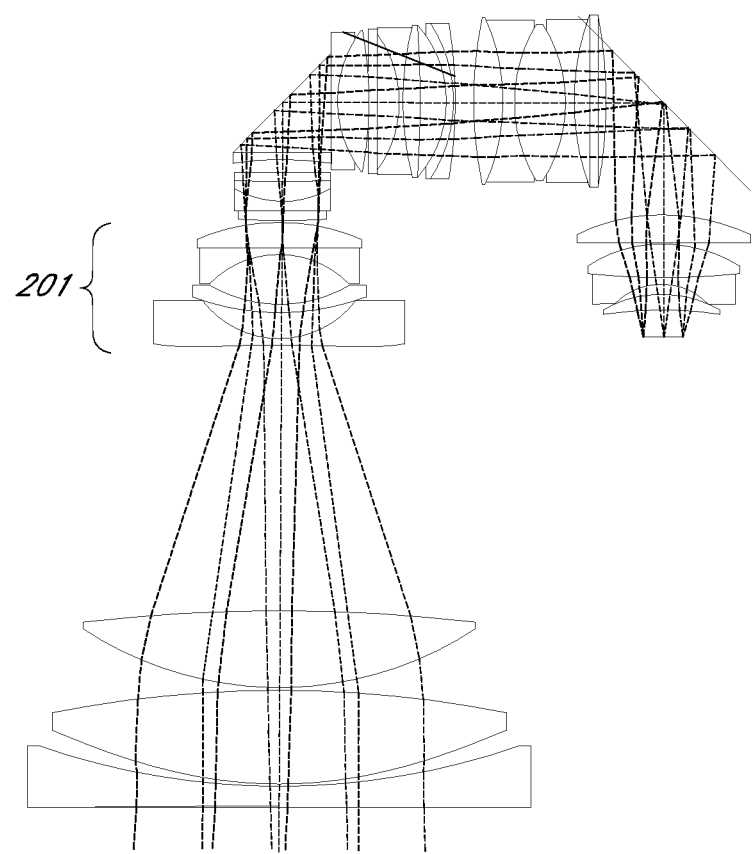

FIGS. 9A, 9B and 9C are optical diagrams of a zoom lens system where the liquid lens cells and folds have been strategically placed to advantageously shorten the length of the lens system. Light enters the lens system through lens group 200. Lens group 201 moves to substantially provide zooming. The light rays pass through the iris or stop 202 and enter lens group 203 comprising a liquid lens cell. Fold 204 directs the light through lens group 205, which comprises a liquid lens cell having a variable surface 206. The light rays then pass through lens group 207. Fold 208 redirects the light rays through lens group 209 and towards an image plane 210. FIG. 9A illustrates a focal length of approximately 6 mm, F/2.8, and infinity focus. FIG. 9B illustrates a focal length of approximately 15 mm, F/2.8, and infinity focus. FIG. 9C illustrates a focal length of approximately 51 mm, F/2.8 and infinity focus.

The first liquid lens cell in lens group 203 has a largest clear aperture diameter of approximately 10 mm. The second liquid lens cell in lens group 205 has a largest clear aperture diameter of approximately 16 mm. By including a camera flash to slow down the taking aperture at or near the long focal length, it may be possible to revert to one liquid lens cell.

It is to be noted that various changes and modifications will become apparent to those skilled in the art. Such changes and modifications are to be understood as being included within the scope of the invention as defined by the appended claims.

What is claimed is:

1. A zoom lens system having a zoom range and configured to collect radiation emanating from an object side space of the zoom lens system and deliver the radiation to an image side space, the zoom lens system comprising:
    an objective lens group configured to be axially stationary and positively powered;
    a zoom lens group positioned on an image side of the objective lens group and continuously movable along an optical axis over the entire zoom range;
    an axially stationary lens group aligned along the optical axis and positioned on an image side of the zoom lens group, the axially stationary lens group comprising at least one liquid lens cell, the liquid lens cell comprising a first liquid in contact with a second liquid to form an optical surface having a variable shape between the contacting liquids;
    an axially stationary optical stop positioned along the optical axis between the zoom lens group and the axially stationary lens group, the optical stop having an iris configured to change a size of its diameter; and
    an optical redirection element aligned to form a fold along the optical axis,
    wherein the objective lens group, the axially stationary lens group, the zoom lens group, and the optical redirection element collect radiation emanating from the object side space of the zoom lens system and deliver the radiation to the image side space without forming an intermediate image along the folded optical axis, wherein the objective lens group, the zoom lens group, the optical stop, and the axially stationary lens group are positioned along the optical axis before the optical redirection element,
    wherein a zoom ratio of the zoom lens system is greater than 3×.

2. The zoom lens system of claim 1, wherein the zoom lens system comprises a single axially movable zoom lens group.

3. The zoom lens system of claim 1, wherein the axially movable zoom lens group does not include a liquid lens cell.

4. The zoom lens system of claim 1, wherein the optical redirection element comprises a mirror.

5. The zoom lens system of claim 1, wherein the optical redirection element comprises a prism.

6. The zoom lens system of claim 1, wherein the optical redirection element reduces the physical length of the zoom lens system.

7. The zoom lens system of claim 1, wherein the liquid lens cell is located between the axially movable zoom lens group and the image side space on the common optical axis.

8. The zoom lens system of claim 1, further comprising a control module comprising electronic circuitry configured to control the shape of the contacting optical surface and a position of the zoom lens group on the optical axis.

9. The zoom lens system of claim 8, wherein a lookup table provides a first index value corresponding to a focal setting and a second index value corresponding to a zoom setting to the control module to electronically control the shape of the contacting optical surface and a position of the zoom lens group on the optical axis.

10. The zoom lens system of claim 1, wherein the diameter of the iris is configured to decrease with an increase in a focal length of the zoom lens system.

11. The zoom lens system of claim 1, wherein the zoom ratio is at least 7×.

12. The zoom lens system of claim 1, wherein the zoom ratio is less than 8.5×.

13. A camera system comprising:
    a zoom lens comprising, in order along a common optical path from an object side of the zoom lens to an image side of the zoom lens, an axially stationary objective lens having a positive optical power, a movable lens group, an axially stationary optical stop having an iris with a variable diameter, a liquid cell lens group and an optical redirection element, the objective lens group, the movable lens group, the liquid cell lens group, the optical stop, and the optical redirection element aligned on the common optical path, wherein the movable lens group is continuously movable along the optical path over an entire zoom range and the optical redirection element redirects the radiation axis to form a fold in the optical path; and an image capture element positioned at a focal location on the image side of the zoom lens, wherein the zoom lens system does not form an intermediate image in the folded optical path, wherein a zoom ratio of the zoom lens is greater than 3×.

14. The camera system of claim 13, wherein the zoom lens comprises a single movable lens group.

15. The camera system of claim 13, wherein the image capture element is a CCD detector.

16. The camera system of claim 13, wherein the image capture element is film.

17. The camera system of claim 13, wherein the image capture element is a CMOS detector.

18. The camera system of claim 13, further comprising a control module comprising electronic circuitry configured to control an optical power of the liquid cell lens group and a position of the zoom lens group along the optical path.

19. The camera system of claim 18, wherein a lookup table provides a first index value corresponding to a focal setting and a second index value corresponding to a zoom setting to the control module to electronically control the optical power of the liquid cell lens group and the position of the movable lens group along the optical path.

20. The camera system of claim 13, wherein the diameter of the iris is configured to decrease with an increase in a focal length of the zoom lens.

21. The camera system of claim 13, wherein the zoom ratio is at least 7×.

22. The camera system of claim 13, wherein the zoom ratio is less than 8.5×.

* * * * *

UNITED STATES PATENT AND TRADEMARK OFFICE
CERTIFICATE OF CORRECTION

PATENT NO. : 8,773,766 B2
APPLICATION NO. : 12/327651
DATED : July 8, 2014
INVENTOR(S) : James H. Jannard Page 1 of 1

It is certified that error appears in the above-identified patent and that said Letters Patent is hereby corrected as shown below:

In the Specification

Column 11 at line 58, Change "change" to --change in--.

In the Claims

Column 14 line 51, Claim 9, change "a" to --the--.

Column 14 line 63, Claim 13, change "lens" to --lens group--.

Signed and Sealed this
Twenty-fourth Day of February, 2015

Michelle K. Lee
*Deputy Director of the United States Patent and Trademark Office*